US012596629B1

(12) United States Patent
Pareek et al.

(10) Patent No.: US 12,596,629 B1
(45) Date of Patent: Apr. 7, 2026

(54) SYSTEM FOR DETECTING ERRORS IN GENERATIVE AI OUTPUTS

(71) Applicant: Future AGI Inc., Lewes, DE (US)

(72) Inventors: Nikhil Pareek, Lewes, DE (US);
Rishav Hada, Lewes, DE (US); Garvit Sapra, Lewes, DE (US)

(73) Assignee: FUTURE AGI INC., Lewes, DE (US)

( * ) Notice: Subject to any disclaimer, the term of this patent is extended or adjusted under 35 U.S.C. 154(b) by 0 days.

(21) Appl. No.: 19/227,972

(22) Filed: Jun. 4, 2025

(51) Int. Cl.
| | |
|---|---|
| *G06F 11/00* | (2006.01) |
| *G06F 11/3604* | (2025.01) |
| *G06N 5/022* | (2023.01) |

(52) U.S. Cl.
CPC ......... *G06F 11/3608* (2013.01); *G06N 5/022* (2013.01)

(58) Field of Classification Search
CPC ............. G06F 11/1476; G06F 11/0775; G06F 11/3608
See application file for complete search history.

(56) References Cited

U.S. PATENT DOCUMENTS

| | | | |
|---|---|---|---|
| 2024/0370709 A1* | 11/2024 | Siebel | G06N 3/047 |
| 2024/0386207 A1 | 11/2024 | Emrey et al. | |
| 2025/0110840 A1* | 4/2025 | Amarasingham ... | G06F 11/0775 |
| 2025/0200333 A1* | 6/2025 | Kedzie | G06N 3/045 |
| 2025/0258708 A1* | 8/2025 | Crabtree | G06F 9/5027 |

FOREIGN PATENT DOCUMENTS

| | | |
|---|---|---|
| IN | 202441082001 A | 11/2024 |

* cited by examiner

*Primary Examiner* — Charles Ehne
(74) *Attorney, Agent, or Firm* — Jason A. Smith; Shumaker, Loop & Kendrick, LLP

(57) ABSTRACT

The present disclosure describes a system for detecting errors in outputs generated by GenAI models. The system includes a knowledge base of domain-specific evaluation rules and historical error patterns stored. The system parses each received GenAI output, then applies a recommendation algorithm to produce a weighted metric profile defining evaluation criteria and associated rules. Further, the system generates an embedding for the output, calibrates criterion weights by comparing the embedding to domain vectors in the knowledge base, and executes a neural network-trained on public benchmarks and enterprise-annotated examples—to yield per-criterion scores and pass-fail explanations. The processor identifies breaches by comparing scores to thresholds, creates structured error stubs, and localizes errors by projecting attention maps onto text tokens or extracting gradient-based image regions. Finally, it updates the knowledge base-adding new error patterns, adjusting rule weights, and revising thresholds—to continuously refine the evaluation process.

20 Claims, 8 Drawing Sheets

Multi-Modal Evaluation Process
400

Input Processing
202

Text Input
404

Audio Input
406

Image Input
408

Video Input
410

Contextualization Module
412

Rule Extraction Engine
414

External Sources
422

Evaluation Pipeline
416

Outlier Handler
418

User Feedback Interface
424

Knowledge Base Updater
420

SYSTEM FOR DETECTING ERRORS IN GENERATIVE AI OUTPUTS

FIELD OF INVENTION

The present disclosure relates to artificial intelligence evaluation systems, and more particularly to a system for detecting errors, hallucinations, and biases in outputs generated by generative artificial intelligence models using a multi-agent evaluation framework with adaptive learning capabilities.

BACKGROUND

Generative artificial intelligence models have rapidly evolved to produce human-like content across multiple modalities, including text, images, audio, and video. These models are increasingly deployed in business-critical applications such as customer support systems, content generation platforms, automated documentation tools, and decision-support systems. As organizations integrate these technologies into their workflows, the quality and reliability of AI-generated outputs become paramount concerns.

Traditional evaluation methodologies for AI systems typically rely on static benchmarks and predefined metrics that may not adequately capture the complexities of real-world applications. Many existing evaluation approaches focus on narrow performance indicators and fail to assess outputs comprehensively across different quality dimensions such as factual accuracy, logical coherence, potential biases, and contextual appropriateness. Furthermore, these conventional methods often operate in isolation, evaluating single aspects of model performance without considering the interconnected nature of various quality factors.

The challenge of evaluating generative AI outputs is compounded by the dynamic nature of these systems and their tendency to produce outputs that may contain factual inaccuracies, logical inconsistencies, or exhibit unintended biases. These issues can manifest differently across various domains and use cases, making it difficult to establish universal evaluation criteria. Additionally, as AI models continue to advance and new capabilities emerge, evaluation frameworks must adapt to assess novel types of outputs and potential failure modes.

Current evaluation systems also face scalability challenges when deployed in production environments where large volumes of AI-generated content must be assessed continuously. Manual review processes are time-intensive and may not provide consistent evaluation standards across different reviewers or evaluation sessions. Automated evaluation tools, while more scalable, often lack the sophistication to perform nuanced assessments that consider domain-specific requirements and contextual factors.

The integration of multiple evaluation criteria and the need for interpretable assessment results further complicate the evaluation process. Organizations require evaluation systems that can not only identify potential issues in AI outputs but also provide actionable insights for improvement and maintain transparency in their assessment methodologies. The ability to adapt evaluation criteria based on specific use cases and evolving requirements represents another area where existing solutions may fall short.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

According to an aspect of the present disclosure, a system for detecting errors, hallucinations, and biases in outputs generated by generative artificial intelligence models is provided. The system comprises a memory storing a knowledge base containing domain-specific evaluation rules and historical error patterns. The system further comprises a processor operatively coupled to the memory and configured for parsing a received Generative Artificial Intelligence (GenAI) output to generate a metadata string comprising one or more tags. The processor applies a recommendation algorithm to the metadata string to generate a weighted metric profile for evaluating the GenAI output, wherein the weighted metric profile comprises one or more criteria for evaluation and associated evaluation rules. The processor generates an embedding corresponding to the GenAI output. The processor determines weights of the one or more criteria based on similarity between the embedding and domain vectors stored in the knowledge base. The processor applies a neural network, trained on benchmark and enterprise-annotated data, to generate per-criterion scores and pass-fail rationales. The processor detects a set of error stubs by comparing the per-criterion scores to corresponding thresholds to identify one or more criterion breaches. The processor localizes one or more error positions within the output based on the set of error stubs. The processor updates the knowledge base based on the detected error stubs to continuously improve GenAI output evaluation process, wherein the knowledge base is updated by one or more of adding newly detected error patterns, adjusting weights of domain-specific evaluation rules, and revising threshold for subsequent evaluations.

According to other aspects of the present disclosure, the system may include one or more of the following features. Generating the embedding may comprise applying a byte-pair encoding model to text outputs, applying a vision-transformer CLS head to image outputs, and applying a pretrained audio embedding model to audio outputs. The set of error stubs may comprise a criterion identifier, a breached threshold, an actual score, and a rationale pointer, and the set of error stubs may be stored in a structured record. The system may further comprise classifying the output as one of text, image, audio, or video, wherein classifying the output may comprise applying a modality classifier to assign the output to the text, image, audio, or video category. The system may generate an evaluation report comprising the error stubs, localized error positions, and associated pass-fail rationales. Generating the weighted metric profile may comprise identifying a metric profile from a set of profiles based on prior evaluation selections, wherein the metric profile may be identified by the recommendation algorithm. Scoring the output may comprise executing the neural network comprising thirty billion parameters, the neural network having been fine-tuned in two sequential passes, the two sequential passes comprising a first fine-tuning pass on item-rationale sets drawn from one or more publicly available evaluation suites to establish canonical scoring dimensions comprising one or more of factual accuracy, coherence, reasoning quality, harmfulness, bias, and robustness, wherein an evaluation suite may comprise collections of benchmark tasks, example inputs, corresponding expected outputs or rationales, and scoring protocols for one or more quality dimensions, and a second fine-tuning pass on examples drawn from business workflows, the examples comprising one or more of customer-support transcripts, policy-draft revisions, marketing copy, code-review snippets, synthetic image captions, audio help-desk conversations, and social media posts annotated with evaluation criteria and pass-fail rationales. The neural network may be dynamically prompted at runtime with determined weights of the one or more criteria for evaluating the GenAI output, for each criterion, a numeric score and a natural-language rationale. Generating an embedding corresponding to the classified output may comprise producing a fixed-length embedding vector that encodes semantic and structural features of the classified output, normalizing the fixed-length embedding vector to unit length, and using the normalized embedding vector as a lookup key into the domain vectors stored in the knowledge base to retrieve the one or more criterion weights. Determining weights may comprise computing cosine similarity between the embedding and each domain vector and adjusting the one or more criterion weights according to the computed similarities. The per-criterion scores may be generated for factual accuracy, coherence, bias, and robustness. Localizing error positions may comprise projecting an attention map onto text tokens, selecting a mask with maximum rule-violation gradient for images, or identifying time windows exceeding a violation likelihood threshold for audio or video. The system may further comprise providing feedback through a software development kit integrated with an AI application to update model parameters based on the evaluation report. The system may further comprise monitoring generative artificial intelligence outputs in real time and adjusting evaluation thresholds based on model performance history. The system may further comprise integrating a user-provided knowledge base into the knowledge base to adapt evaluation rules to domain-specific terminology.

According to another aspect of the present disclosure, a computer-implemented method for detecting errors, hallucinations, and biases in outputs generated by generative artificial intelligence models is provided. The method comprises parsing, by a processor, a received Generative Artificial Intelligence (GenAI) output to generate a metadata string comprising one or more tags. The method further comprises applying, by the processor, a recommendation algorithm to the metadata string to generate a weighted metric profile for evaluating the GenAI output, wherein the weighted metric profile comprises one or more criteria for evaluation and associated evaluation rules. The method comprises generating, by the processor, an embedding corresponding to the GenAI output. The method comprises determining, by the processor, weights of the one or more criteria based on similarity between the embedding and domain vectors stored in a knowledge base. The method comprises applying, by the processor, a neural network, trained on benchmark and enterprise-annotated data, to generate per-criterion scores and pass-fail rationales. The method comprises detecting, by the processor, a set of error stubs by comparing the per-criterion scores to corresponding thresholds to identify one or more criterion breaches. The method comprises localizing, by the processor, one or more error positions within the output based on the set of error stubs. The method comprises updating, by the processor, the knowledge base based on the detected error stubs to continuously improve GenAI output evaluation process, wherein the knowledge base is updated by one or more of adding newly detected error patterns, adjusting weights of domain-specific evaluation rules, and revising threshold for subsequent evaluations.

According to other aspects of the present disclosure, the method may include one or more of the following features. Generating the embedding may comprise applying a byte-pair encoding model to text outputs, applying a vision-transformer CLS head to image outputs, and applying a pretrained audio embedding model to audio outputs. The set of error stubs may comprise a criterion identifier, a breached threshold, an actual score, and a rationale pointer, and the set of error stubs may be stored in a structured record. The method may further comprise classifying the output as one of text, image, audio, or video, wherein classifying the output may comprise applying a modality classifier to assign the output to the text, image, audio, or video category. The method may comprise generating an evaluation report comprising the error stubs, localized error positions, and associated pass-fail rationales. Generating the weighted metric profile may comprise identifying a metric profile from a set of profiles based on prior evaluation selections, wherein the metric profile may be identified by the recommendation algorithm. The neural network may comprise thirty billion parameters, the neural network having been fine-tuned in two sequential passes, the two sequential passes comprising a first fine-tuning pass on item-rationale sets drawn from one or more publicly available evaluation suites to establish canonical scoring dimensions comprising one or more of factual accuracy, coherence, reasoning quality, harmfulness, bias, and robustness, and a second fine-tuning pass on examples drawn from business workflows, the examples comprising one or more of customer-support transcripts, policy-draft revisions, marketing copy, code-review snippets, synthetic image captions, audio help-desk conversations, and social media posts annotated with evaluation criteria and pass-fail rationales. Determining weights may comprise computing cosine similarity between the embedding and each domain vector and adjusting the one or more criterion weights according to the computed similarities. Localizing error positions may comprise projecting an attention map onto text tokens, selecting a mask with maximum rule-violation gradient for images, or identifying time windows exceeding a violation likelihood threshold for audio or video.

The foregoing general description of the illustrative embodiments and the following detailed description thereof are merely exemplary aspects of the teachings of this disclosure and are not restrictive.

BRIEF DESCRIPTION OF FIGURES

Non-limiting and non-exhaustive examples are described with reference to the following figures.

DETAILED DESCRIPTION

Figure 1:
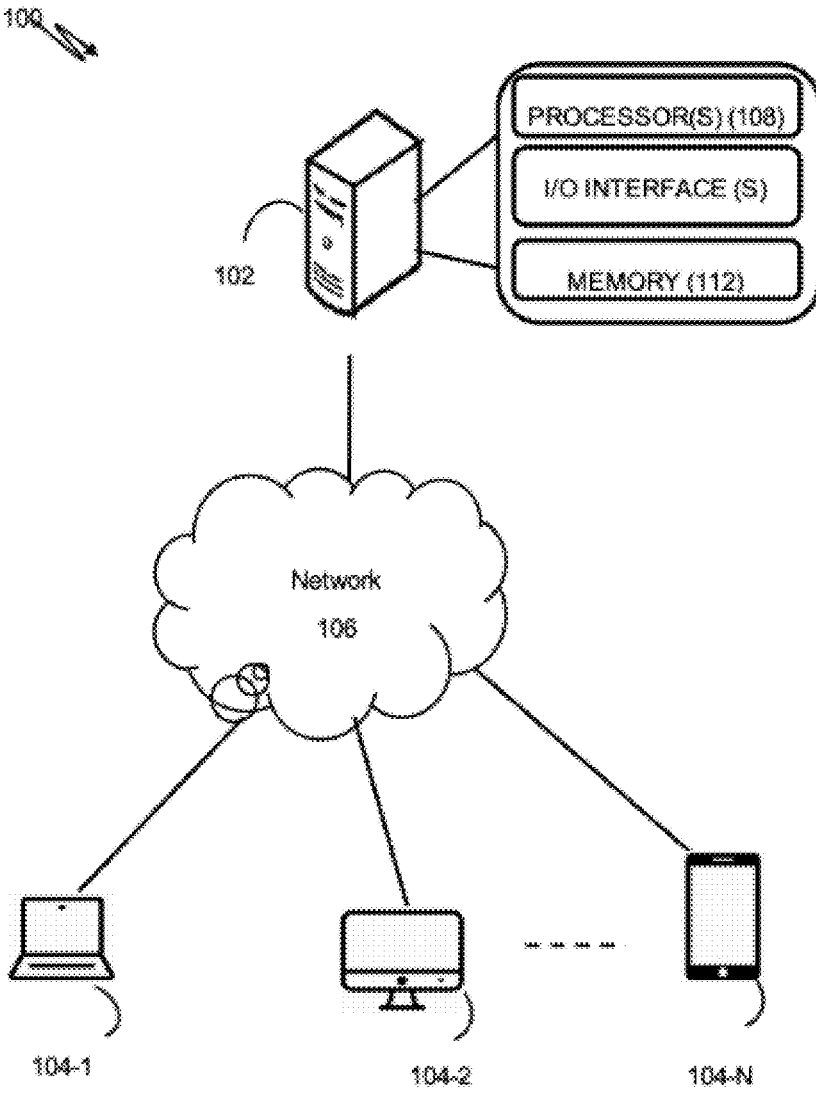
FIG. 1 is a diagram of a network architecture for implementing a generative artificial intelligence evaluation system.

Some embodiments of this disclosure, illustrating all its features, will now be discussed in detail. The words "receiving," "comparing," "identifying," "detecting," "generating," "determining," and other forms thereof, are intended to be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described but is to be accorded the widest scope consistent with the principles and features described herein.

Generative artificial intelligence models have become increasingly prevalent across various applications, producing outputs in multiple modalities including text, images, audio, and video. As these models are deployed in production environments, the evaluation of their outputs presents challenges that extend beyond traditional single-metric assessments. Conventional evaluation approaches may rely on static benchmarks or limited scoring mechanisms that may not adequately address the complexities of real-world applications.

Multi-modal agentic evaluation frameworks represent an approach to assessing generative AI outputs through the coordination of specialized evaluation agents. These frameworks may employ multiple agents, each configured to evaluate specific aspects of model performance across different modalities. In some cases, evaluation agents may assess dimensions such as factual accuracy, logical reasoning, coherence, bias detection, and robustness across text, image, audio, and video outputs.

The agentic approach may enable dynamic evaluation strategies that can adapt to different domains, use cases, and evaluation criteria. In some cases, specialized agents may operate in coordinated workflows, where each agent contributes specific evaluation capabilities to produce comprehensive assessments. The framework may incorporate domain-specific knowledge bases and user-defined evaluation criteria to calibrate assessments according to particular application requirements.

Multi-modal evaluation may involve processing different types of input data through modality-specific techniques. Text inputs may be processed through tokenization and embedding generation, while images may be converted to vector representations using vision transformer models. Audio and video content may be processed through corresponding embedding techniques to enable consistent evaluation across modalities.

The framework may incorporate feedback mechanisms that allow for iterative refinement of evaluation criteria and scoring methodologies. In some cases, evaluation results may include detailed rationales and error localization information, enabling users to understand specific aspects of model outputs that contribute to evaluation scores. This approach may provide transparency in the evaluation process and facilitate targeted improvements to generative AI systems.

The present invention significantly improves system efficiency by implementing a multi-agent evaluation framework that reduces evaluation time through parallel processing capabilities while maintaining comprehensive assessment quality. The coordinated chain-of-agents pipeline may enable simultaneous evaluation across multiple quality dimensions, eliminating the sequential bottlenecks present in conventional single-agent evaluation systems. In some cases, the system may achieve substantial time savings by distributing evaluation tasks among specialized agents that operate concurrently on different aspects of the same generative AI output.

The invention provides novel technical solutions to the field of artificial intelligence evaluation by introducing adaptive weight determination based on embedding similarity analysis. This approach may enable dynamic calibration of evaluation criteria according to content characteristics, representing a significant advancement over static evaluation frameworks that apply uniform criteria regardless of content type or domain context. The system may automatically adjust evaluation parameters based on semantic similarity between the input content and stored domain vectors, providing contextually appropriate assessments that conventional systems cannot achieve.

The technical advancement of real-time knowledge base updating may enable continuous improvement of evaluation accuracy without requiring manual reconfiguration or system downtime. The self-optimization framework may automatically incorporate newly detected error patterns and adjust evaluation thresholds based on accumulated performance data, allowing the system to evolve and adapt to emerging AI model behaviors and failure modes. This capability may represent a concrete improvement over existing evaluation systems that rely on static rule sets and require periodic manual updates to maintain effectiveness.

The invention may provide enhanced error localization capabilities through modality-specific attention mapping and gradient analysis techniques. For text content, the system may project attention maps onto individual tokens to identify specific words or phrases contributing to evaluation failures. For image content, the system may utilize object-masking heads with maximum rule-violation gradient selection to pinpoint problematic visual regions. For audio and video content, the system may identify precise time windows where violations occur, enabling targeted remediation that conventional evaluation systems cannot provide.

The multi-modal embedding generation approach may enable unified evaluation across diverse content types through a single framework, eliminating the need for separate evaluation systems for different modalities. The system may apply byte-pair encoding for text, vision-transformer CLS heads for images, and pretrained audio models for audio content, normalizing all outputs to fixed-length vectors that enable consistent processing. This technical solution may reduce system complexity and maintenance overhead while providing comprehensive evaluation capabilities across all major generative AI output modalities.

The neural network architecture comprising thirty billion parameters with sequential fine-tuning passes may provide evaluation capabilities that surpass conventional benchmark-based assessment methods. The two-stage fine-tuning approach may establish canonical scoring dimensions through publicly available evaluation suites while adapting to real-world business workflows through enterprise-annotated data. This technical advancement may enable the system to bridge the gap between academic benchmarks and practical deployment requirements, providing evaluation results that align with both theoretical standards and operational needs.

Referring now to FIG. 1, a network architecture 100 for implementing a generative artificial intelligence evaluation system is disclosed. The network architecture 100 includes a system 102 that serves as the central processing unit for the evaluation framework. The system 102 may comprise a processor 108 and a memory 112 that store evaluation algorithms, knowledge base components, and system modules for processing generative AI outputs.

Although the present disclosure is explained considering that the system 102 is implemented on a server, it may be understood that the system 102 may be implemented in a variety of computing systems, such as a laptop computer, a desktop computer, a notebook, a workstation, a virtual environment, a mainframe computer, a network server, or a cloud-based computing environment. The system 102 may connect to a network 106, which facilitates communication between the system 102 and multiple client devices. The network 106 may enable distribution of evaluation services and collection of generative AI outputs from various sources. Connected to the network 106 are multiple client devices, including a client device 104-1, a client device 104-2, and additional devices extending to a client device 104-N, where N represents a variable number of connected devices.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

The processor 108 within the system 102 may execute evaluation algorithms and manage chain-of-agents workflows for assessing generative artificial intelligence outputs. The processor 108 may coordinate the sequential processing of AI-generated content through evaluation modules and handle computational tasks related to error detection, bias identification, and hallucination analysis. The processor 108 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the processor 108 is configured to fetch and execute computer-readable instructions stored in the memory 112.

The memory 112 may store a knowledge base containing domain-specific evaluation rules and historical error patterns. In some cases, the knowledge base may store domain glossaries, compliance rules, and past failure modes that inform the evaluation process. The knowledge base may also contain references to known failure modes, historical benchmarks, and best-practice guidelines that enable the system to identify recurring error patterns and align evaluations with established standards. The memory 112 may additionally store various evaluation models, neural network parameters, and configuration data used by the evaluation framework. The memory 112 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, Solid State Disks (SSD), optical disks, and magnetic tapes.

The client devices 104-1, 104-2, and 104-N may represent various endpoints that submit generative AI outputs for evaluation or receive evaluation results from the system 102. These client devices may include computers, mobile devices, or other computing systems that interface with the evaluation framework through the network 106. Examples of the client devices 104 may include, but are not limited to, a portable computer, a personal digital assistant, a handheld device, and a workstation. The network architecture 100 may support scalable deployment of the evaluation system, allowing multiple users and applications to access evaluation services simultaneously through the distributed client-server configuration.

As there are various challenges observed in the existing art, the challenges necessitate the need to build the system 102 for a generative artificial intelligence evaluation system. At first, a user may use the user device 104 to access the system 102 via the I/O interface 110. The user may register the user devices 104 using the I/O interface 110 in order to use the system 102. In one aspect, the user may access the I/O interface 110 of the system 102. The detailed functioning of the system 102 is described below with the help of figures.

The system 102 may receive generative artificial intelligence outputs from multiple sources and modalities through various data intake mechanisms. In some cases, the system may process inputs from client applications that generate content across different modalities, including text, images, audio, video, and code. The data reception capabilities may enable the system to handle diverse types of AI-generated content from various generative models and applications.

Text inputs may be received from applications such as conversational agents, content generation tools, document summarization systems, meeting summarization tool, and language translation services. In some cases, text outputs may include customer support responses, marketing copy, policy documents, code comments, meeting summaries, transcripts, and social media posts generated by large language models. The system may receive text data in various formats, including plain text, structured documents, and formatted content with metadata annotations.

Image inputs may be received from AI-powered image generation applications, including text-to-image models, image editing tools, and synthetic media creation systems. In some cases, image outputs may include generated artwork, product visualizations, synthetic photographs, and modified images produced by diffusion models or generative adversarial networks. The system may process image data in multiple formats, including standard image file types and embedded image data within larger documents or presentations.

Audio inputs may be received from speech synthesis systems, music generation applications, and voice cloning tools. In some cases, audio outputs may include synthesized speech for virtual assistants, generated music compositions, podcast content, and audio descriptions for accessibility applications. The system may handle audio data in various formats and sampling rates, accommodating different quality levels and compression standards used by generative audio models.

Video inputs may be received from video generation systems, animation tools, and multimedia content creation applications. In some cases, video outputs may include synthetic video content, animated sequences, deepfake videos, and AI-generated educational or entertainment content. The system may process video data with different resolutions, frame rates, and encoding formats produced by various generative video models.

Code inputs may be received from automated programming tools, code generation assistants, and software development applications. In some cases, code outputs may include generated functions, complete programs, code refactoring suggestions, and documentation generated by code-focused language models. The system may handle code in multiple programming languages and formats, including standalone code snippets and integrated development environment outputs.

The multi-modal evaluation process may handle cross-modal consistency checks to ensure coherence across different types of content when multiple modalities are present in a single evaluation task. In some cases, the system may verify that generated captions accurately describe corresponding images, that synthesized audio matches provided text transcripts, or that generated code implementations align with natural language specifications. The cross-modal evaluation capabilities may enable the system to detect inconsistencies between different modalities within the same generative AI output.

The data intake mechanisms may accommodate real-time streaming inputs as well as batch processing of stored content. In some cases, the system may receive continuous streams of generative AI outputs from production applications, enabling real-time evaluation and feedback. The system may also process archived or stored generative AI outputs for retrospective analysis and model performance assessment across extended time periods.

The system may receive metadata accompanying the generative AI outputs, including information about the source model, generation parameters, intended use case, and domain context. In some cases, this metadata may inform the evaluation process by providing context about the generation conditions and expected quality standards. The metadata may include timestamps, model version information, prompt details, and user-specified evaluation criteria that guide the assessment process.

The system may implement tag extraction processes to parse received generative artificial intelligence outputs and generate metadata strings comprising one or more tags. The tag extraction functionality may enable the system to identify contextual information embedded within or associated with the AI-generated content, facilitating appropriate evaluation strategy selection and rule application.

The processor may be configured for parsing a received Generative Artificial Intelligence (GenAI) output to generate a metadata string comprising one or more tags. In some cases, the parsing process may analyze both the content structure and accompanying metadata to extract relevant classification information. The tag generation process may involve natural language processing techniques, pattern recognition algorithms, and metadata analysis to identify domain-specific characteristics of the received content.

Domain tag extraction may involve analyzing the subject matter and terminology present within the generative AI output to determine the applicable domain or field. In some cases, the system may identify domain tags such as "legal," "medical," "financial," "technical," or "marketing" based on vocabulary analysis, topic modeling, and domain-specific terminology detection. The domain tag extraction process may reference stored domain vocabularies and classification models to categorize content according to specialized knowledge areas.

Language tag identification may involve detecting the primary language or languages present within the generative AI output. In some cases, the system may identify language tags such as "English," "Spanish," "French," "Mandarin," or "multilingual" through language detection algorithms and character encoding analysis. The language tag extraction may accommodate code-switching scenarios where multiple languages appear within a single output, enabling appropriate evaluation rule selection for multilingual content.

Business-objective tag extraction may involve identifying the intended purpose or application context of the generative AI output. In some cases, the system may generate business-objective tags such as "customer-support," "legal-draft," "marketing-copy," "code-generation," "content-summarization," or "educational-material" based on content analysis and contextual indicators. The business-objective identification process may analyze structural patterns, formatting characteristics, and content themes to determine the intended use case.

The contextualization module may correlate outputs with additional metadata, usage scenarios, or rule prompts embedded within the broader application. In some cases, the contextualization process may extract tags from application programming interface parameters, user-specified categories, or system-generated annotations that accompany the generative AI output. The correlation process may combine explicit metadata with inferred characteristics to produce comprehensive tag sets.

The metadata string generation process may combine multiple tag types into structured representations that inform subsequent evaluation processes. In some cases, the system may create metadata strings such as "domain: legal,language: English,objective: contract-review" or "domain: medical,language: multilingual,objective: patient-communication" that capture multiple dimensions of content classification. The structured metadata format may enable efficient lookup and matching operations during evaluation rule selection.

Tag extraction may involve hierarchical classification schemes where general categories are refined into specific subcategories. In some cases, a domain tag of "technical" may be further classified into subcategories such as "software-engineering," "data-science," or "cybersecurity" based on detailed content analysis. The hierarchical approach may enable fine-grained evaluation rule selection while maintaining organizational structure within the tag taxonomy.

The system may implement confidence scoring for extracted tags to indicate the reliability of tag assignments. In some cases, the tag extraction process may generate confidence values that reflect the certainty of domain classification, language detection, or business-objective identification. The confidence scoring may inform downstream evaluation processes and enable fallback strategies when tag assignments are uncertain.

Temporal tag extraction may identify time-sensitive characteristics of generative AI outputs, such as content freshness requirements or temporal context references. In some cases, the system may extract temporal tags that indicate whether content requires real-time accuracy verification, historical context validation, or future-oriented scenario analysis. The temporal classification may influence the selection of evaluation criteria and knowledge base references.

The tag extraction process may accommodate custom tag vocabularies defined by users or organizations to address domain-specific classification needs. In some cases, the system may incorporate user-defined tag categories such as "brand-compliance," "regulatory-adherence," or "accessibility-standards" that reflect organizational evaluation priorities. The custom tag integration may enable specialized evaluation workflows tailored to specific business requirements.

The system may implement recommendation algorithms to analyze metadata strings and generate weighted metric profiles that guide the evaluation process for generative artificial intelligence outputs. The recommendation algorithm functionality may enable the system to select appropriate evaluation criteria and associated rules based on contextual information extracted from the received content.

The processor may be configured for applying a recommendation algorithm to the metadata string to generate a weighted metric profile for evaluating the GenAI output, wherein the weighted metric profile comprises one or more criteria for evaluation and associated evaluation rules. In some cases, the recommendation algorithm may analyze the combination of domain tags, language tags, and business-objective tags to determine which evaluation dimensions receive priority weighting for a particular generative AI output.

The weighted metric profile generation process may involve mapping metadata characteristics to predefined evaluation frameworks that address specific quality dimensions. In some cases, the system may generate metric profiles that emphasize factual accuracy and toxicity detection for public-facing chatbot outputs, while prioritizing logical reasoning and robustness for code generation tasks. The weighting determination may reflect the relative importance of different evaluation criteria based on the intended use case and domain context.

The recommendation algorithm may utilize collaborative filtering techniques to identify patterns in historical evaluation selections and outcomes. In some cases, the algorithm may analyze previous evaluation configurations for similar content types and domains to recommend metric profiles that have demonstrated effectiveness in comparable scenarios. The collaborative approach may enable the system to leverage accumulated evaluation experience to improve recommendation accuracy over time.

Content-based filtering may complement collaborative approaches by analyzing the intrinsic characteristics of the generative AI output to recommend appropriate evaluation criteria. In some cases, the algorithm may examine content complexity, topic sensitivity, and structural characteristics to determine which evaluation dimensions are most relevant for the specific output being assessed. The content analysis may inform weighting decisions that reflect the particular challenges and requirements associated with different types of generated content.

The system may implement generating the weighted metric profile by identifying a metric profile from a set of profiles based on prior evaluation selections using the recommendation algorithm. In some cases, the recommendation engine may maintain a library of predefined metric profiles that correspond to common evaluation scenarios, such as customer support interactions, legal document generation, marketing content creation, or technical documentation production. The profile identification process may match current metadata characteristics with stored profile templates to accelerate evaluation setup.

Hybrid recommendation approaches may combine multiple algorithmic techniques to improve metric profile selection accuracy. In some cases, the system may integrate collaborative filtering, content-based analysis, and knowledge-based reasoning to generate comprehensive recommendations that account for historical patterns, content characteristics, and domain expertise. The hybrid approach may provide robust recommendation capabilities that adapt to diverse evaluation scenarios and user preferences.

A planning agent may define evaluation strategy by analyzing context and selecting appropriate benchmarks, metrics, and constraints. In some cases, the planning agent may receive the weighted metric profile from the recommendation algorithm and translate the profile specifications into executable evaluation workflows. The evaluation strategy definition process may involve scheduling evaluation tasks, allocating computational resources, and configuring evaluation parameters according to the recommended metric weightings.

Dynamic weighting adjustment may enable the recommendation algorithm to modify weighted metric profiles based on real-time analysis of content characteristics and evaluation context. In some cases, the algorithm may increase the weight of bias detection criteria when processing content intended for diverse audiences, or enhance factual accuracy weighting when evaluating outputs that make specific claims about verifiable information. The dynamic adjustment capability may ensure that evaluation emphasis aligns with the particular risks and requirements associated with different content types.

The metric profile structure may include numerical weights that quantify the relative importance of different evaluation criteria within the assessment framework. In some cases, a metric profile for legal document generation may assign high weights to factual accuracy and compliance checking while assigning lower weights to creative expression metrics. The numerical weighting system may enable precise calibration of evaluation emphasis according to domain-specific priorities and quality standards.

Domain-specific metric profiles may address the unique evaluation requirements associated with specialized fields and applications. In some cases, medical content evaluation may emphasize safety and accuracy criteria, while creative content assessment may prioritize originality and aesthetic quality measures. The domain specialization may ensure that evaluation frameworks align with professional standards and regulatory requirements specific to different industries and use cases.

The recommendation algorithm may incorporate user feedback and evaluation outcomes to refine metric profile suggestions over time. In some cases, the system may track the effectiveness of different metric profiles in identifying relevant quality issues and adjust recommendation patterns based on user satisfaction and evaluation accuracy metrics. The feedback integration may enable continuous improvement of recommendation quality and alignment with user expectations.

Multi-objective optimization techniques may enable the recommendation algorithm to balance competing evaluation priorities when generating weighted metric profiles. In some cases, the algorithm may need to balance thoroughness and efficiency requirements, or accuracy and speed considerations, when recommending evaluation configurations. The optimization approach may identify metric weightings that achieve acceptable performance across multiple evaluation objectives while respecting computational and time constraints.

Human-in-the-loop recommendation processes may enable users to provide input and override algorithmic suggestions when domain expertise or specific requirements warrant customized evaluation approaches. In some cases, the system may present recommended metric profiles alongside alternative configurations, allowing users to select or modify evaluation criteria based on their understanding of particular quality requirements. The interactive approach may combine algorithmic efficiency with human judgment to optimize evaluation effectiveness.

The recommendation algorithm may maintain evaluation context awareness to ensure that metric profiles remain appropriate as evaluation sessions progress and additional information becomes available. In some cases, the algorithm may adjust recommendations based on intermediate evaluation results, user feedback, or changes in evaluation objectives that occur during the assessment process. The context awareness capability may enable adaptive evaluation strategies that respond to evolving requirements and emerging quality concerns.

The system may implement modality classification processes to categorize generative artificial intelligence outputs according to their content type before applying appropriate evaluation methodologies. The modality classification functionality may enable the system to identify whether received content represents text, image, audio, or video data, facilitating the selection of modality-specific evaluation techniques and processing algorithms.

The system may further comprise classifying the output as one of text, image, audio, or video. In an embodiment, the system may classify the output based on a set of predefined rules or by applying a trained modality classifier. The modality classifier trained to assign the output to the text, image, audio, or video category. In some cases, the modality classifier may analyze content characteristics, file format indicators, and data structure patterns to determine the primary modality of the received generative AI output. The classification process may enable the system to route content through appropriate processing pipelines that address the specific evaluation requirements associated with different content types.

In some embodiment, the modality classifier may be a machine learning algorithms trained on datasets containing examples of text, image, audio, and video content. In some cases, the classifier may employ neural network architectures that analyze content features such as data encoding patterns, file headers, metadata structures, and content signatures to distinguish between different modality types. The training process may involve supervised learning techniques using labeled datasets that represent the full spectrum of generative AI output types encountered in production environments.

Text classification may involve analyzing character encoding, linguistic patterns, and document structure to identify textual content. In some cases, the modality classifier may detect text outputs by examining Unicode character distributions, natural language patterns, and formatting structures that indicate written communication. The text classification process may accommodate various text formats including plain text, structured documents, markup languages, and code representations that may be generated by language models.

Image classification may involve analyzing pixel data, color distributions, and visual structure patterns to identify image content. In some cases, the classifier may detect image outputs by examining file format signatures, image dimensions, color space information, and visual feature distributions that characterize generated images. The image classification process may handle various image formats including raster graphics, vector graphics, and composite images that combine multiple visual elements.

Audio classification may involve analyzing waveform characteristics, frequency distributions, and temporal patterns to identify audio content. In some cases, the modality classifier may detect audio outputs by examining sampling rates, bit depths, frequency spectra, and temporal structure patterns that indicate synthesized or generated audio content. The audio classification process may accommodate various audio formats including compressed audio, uncompressed audio, and multi-channel audio representations produced by generative audio models.

Video classification may involve analyzing frame sequences, temporal continuity, and multimedia structure to identify video content. In some cases, the classifier may detect video outputs by examining frame rate patterns, resolution characteristics, compression indicators, and temporal coherence measures that distinguish video content from static images or audio-only content. The video classification process may handle various video formats including standard video files, animated sequences, and multimedia presentations that combine visual and audio elements.

Multi-modal content classification may address scenarios where generative AI outputs contain multiple modality types within a single deliverable. In some cases, the system may identify composite outputs that include text descriptions accompanying images, audio narration with visual presentations, or video content with embedded textual elements. The multi-modal classification capability may enable the system to apply appropriate evaluation strategies that address the interaction between different content types within unified outputs.

The modality classifier may implement confidence scoring mechanisms that indicate the certainty of classification decisions. In some cases, the classifier may generate confidence values that reflect the reliability of modality assignments, enabling the system to handle ambiguous cases where content characteristics may not clearly indicate a single modality type. The confidence scoring may inform downstream processing decisions and enable fallback strategies when classification uncertainty exceeds acceptable thresholds.

Hierarchical classification approaches may enable the system to identify both primary modality categories and specific subcategories within each modality type. In some cases, text classification may distinguish between natural language text, programming code, structured data, and formatted documents. Image classification may differentiate between photographs, illustrations, diagrams, and synthetic artwork. The hierarchical approach may enable fine-grained processing decisions that address the specific characteristics of different content subtypes.

The classification process may incorporate format analysis techniques that examine file extensions, MIME types, and content headers to supplement content-based classification methods. In some cases, the system may combine format indicators with content analysis to improve classification accuracy and handle edge cases where content characteristics may be ambiguous. The format analysis may provide additional validation for content-based classification decisions and enable rapid processing of clearly identified content types.

Real-time classification capabilities may enable the system to process streaming generative AI outputs and classify content as the content becomes available. In some cases, the modality classifier may analyze partial content streams to provide preliminary classification results that enable early initiation of modality-specific processing pipelines. The real-time classification may reduce overall processing latency and enable responsive evaluation workflows for time-sensitive applications.

Error handling mechanisms may address classification failures and ambiguous cases where content characteristics do not clearly indicate a specific modality type. In some cases, the system may implement fallback classification strategies that assign default modality categories or request additional information when primary classification methods produce uncertain results. The error handling may ensure robust system operation even when encountering unexpected or malformed generative AI outputs.

Human-in-the-loop classification processes may enable manual override of automatic classification decisions when domain expertise or specific knowledge indicates that algorithmic classification results may be incorrect. In some cases, the system may provide interfaces that allow users to review and modify modality assignments, particularly for complex or ambiguous content that may benefit from human judgment. The manual override capability may improve classification accuracy for challenging cases while maintaining automated processing for routine content types.

The system may implement embedding generation processes to convert classified generative artificial intelligence outputs into fixed-length vector representations that enable consistent processing across different modalities. The embedding generation functionality may enable the system to transform diverse content types into standardized numerical formats that facilitate similarity analysis, domain matching, and evaluation criterion weighting.

The processor may be configured for generating an embedding corresponding to the GenAI output. In some cases, the embedding generation process may apply modality-specific techniques that account for the unique characteristics of text, image, audio, and video content while producing comparable vector representations. The embedding creation may enable the system to perform unified analysis operations across different content types within a single evaluation framework.

Generating the embedding may comprise applying a byte-pair encoding model to text outputs, applying a vision-transformer CLS head to image outputs, and applying a pretrained audio embedding model to audio outputs. In some cases, the modality-specific embedding techniques may ensure that the resulting vector representations capture the semantic and structural characteristics relevant to each content type while maintaining dimensional consistency across modalities.

Text embedding generation may involve applying byte-pair encoding models that tokenize textual content and convert the tokenized representations into dense vector formats. In some cases, the byte-pair encoding process may segment text into subword units that balance vocabulary coverage with computational efficiency, enabling the system to handle diverse linguistic patterns and domain-specific terminology. The text embedding process may utilize transformer-based language models that have been trained on large text corpora to capture semantic relationships and contextual dependencies within the generated text content.

The byte-pair encoding approach may accommodate various text formats including natural language text, programming code, structured data representations, and formatted documents. In some cases, the encoding process may preserve important structural information such as formatting markers, code syntax elements, and document organization patterns that inform evaluation decisions. The text embedding generation may produce fixed-length vectors that encode both semantic content and structural characteristics of the input text.

Image embedding generation may involve applying vision-transformer CLS heads that process visual content and extract feature representations suitable for evaluation analysis. In some cases, the vision-transformer approach may divide images into patch sequences that are processed through attention mechanisms to capture spatial relationships and visual patterns within the generated image content. The CLS head component may aggregate patch-level features into unified image representations that encode both local visual details and global compositional characteristics.

The vision-transformer processing may handle various image formats including raster graphics, vector graphics, and composite images that combine multiple visual elements. In some cases, the image embedding process may normalize input images to standard resolutions and color spaces while preserving visual information relevant to quality assessment. The image embedding generation may produce vectors that capture visual semantics, artistic style, technical quality, and content accuracy characteristics.

Audio embedding generation may involve applying pretrained audio embedding models that analyze waveform characteristics and extract acoustic feature representations. In some cases, the audio embedding process may utilize models that have been trained on diverse audio datasets to capture temporal patterns, frequency distributions, and acoustic characteristics relevant to generated audio content evaluation. The pretrained models may encode both low-level acoustic features and high-level semantic information present in synthesized speech, generated music, or other audio outputs.

The audio embedding approach may accommodate various audio formats including compressed audio, uncompressed audio, and multi-channel audio representations. In some cases, the embedding generation process may normalize audio inputs to standard sampling rates and bit depths while preserving acoustic information relevant to quality assessment. The audio embedding generation may produce vectors that encode temporal coherence, acoustic quality, semantic accuracy, and naturalness characteristics.

Video embedding generation may extend the image and audio embedding approaches to handle temporal sequences and multi-modal content. In some cases, the video embedding process may combine frame-level visual analysis with temporal modeling to capture motion patterns, scene transitions, and narrative coherence within generated video content. The video embedding approach may integrate visual and audio embedding techniques when processing multimedia content that includes both visual and auditory components.

Generating an embedding corresponding to the classified output may comprise producing a fixed-length embedding vector that encodes semantic and structural features of the classified output. In some cases, the fixed-length constraint may enable consistent processing operations regardless of the original content size or complexity, facilitating efficient similarity computations and domain matching operations. The semantic encoding may capture meaning-related characteristics while structural encoding may preserve format-specific information relevant to evaluation criteria.

The embedding generation process may comprise normalizing the fixed-length embedding vector to unit length. In some cases, the normalization process may ensure that vector magnitude differences do not interfere with similarity computations and domain matching operations. The unit length normalization may enable the system to focus on directional relationships between embeddings rather than magnitude variations that may result from content length or complexity differences.

The normalized embedding vectors may serve as lookup keys into domain vectors stored in the knowledge base to retrieve criterion weights. In some cases, the lookup process may involve computing similarity measures between the generated embedding and stored domain vectors to identify relevant evaluation contexts and appropriate criterion weightings. The embedding-based lookup approach may enable dynamic evaluation configuration based on content characteristics rather than static rule assignments.

Cross-modal embedding alignment may enable the system to compare and analyze relationships between different content types within unified vector spaces. In some cases, the embedding generation process may apply alignment techniques that ensure text, image, and audio embeddings occupy comparable regions of the vector space when representing semantically related content. The cross-modal alignment may facilitate evaluation scenarios that involve multiple modalities or content type transitions.

Hierarchical embedding structures may enable the system to capture both fine-grained and coarse-grained characteristics of generated content within multi-level vector representations. In some cases, the embedding generation process may produce vectors that encode local features at detailed levels while also capturing global characteristics at abstract levels. The hierarchical approach may enable evaluation processes that address both specific quality issues and overall content assessment.

The embedding generation process may incorporate domain adaptation techniques that adjust vector representations based on the specific evaluation context and target domain. In some cases, the system may apply domain-specific transformation layers that modify base embeddings to emphasize characteristics relevant to particular evaluation scenarios. The domain adaptation may improve the relevance and accuracy of similarity computations and criterion weight determinations.

Temporal embedding techniques may address content types that involve time-dependent characteristics such as audio sequences, video content, or conversational text. In some cases, the embedding generation process may incorporate temporal modeling approaches that capture sequential dependencies and temporal coherence within generated content. The temporal embeddings may enable evaluation of characteristics such as narrative consistency, temporal accuracy, and sequential logic.

The embedding generation process may implement quality-aware encoding techniques that emphasize features relevant to evaluation criteria during vector creation. In some cases, the embedding models may be fine-tuned or adapted to prioritize characteristics such as factual accuracy indicators, bias markers, or coherence signals that inform evaluation decisions. The quality-aware approach may improve the effectiveness of embedding-based evaluation processes by focusing vector representations on evaluation-relevant features.

Incremental embedding updates may enable the system to refine vector representations as additional information becomes available during the evaluation process. In some cases, the embedding generation may incorporate feedback from intermediate evaluation results to adjust vector characteristics and improve subsequent processing accuracy. The incremental approach may enable adaptive evaluation workflows that respond to emerging quality concerns or changing evaluation requirements.

Human-interpretable embedding analysis may provide transparency into the vector generation process and enable users to understand how content characteristics influence evaluation decisions. In some cases, the system may provide visualization tools or analysis interfaces that reveal which content features contribute to specific embedding dimensions and how these features relate to evaluation criteria. The interpretability features may enhance user confidence in evaluation results and facilitate debugging of evaluation processes.

The system may implement weight calibration processes to determine the relative importance of evaluation criteria based on content characteristics and domain context. The weight determination functionality may enable the system to dynamically adjust evaluation emphasis according to the semantic similarity between generated content and stored domain knowledge, facilitating contextually appropriate assessment strategies.

The processor may be configured for determining weights of the one or more criteria based on similarity between the embedding and domain vectors stored in the knowledge base. In some cases, the weight determination process may analyze the relationship between the generated embedding and multiple domain vectors to identify relevant evaluation contexts and appropriate criterion emphasis levels. The similarity-based weighting approach may enable the system to adapt evaluation strategies based on content characteristics rather than applying uniform criteria across all generative AI outputs.

The weight determination process may comprise computing cosine similarity between the embedding and each domain vector and adjusting the one or more criterion weights according to the computed similarities. In some cases, the cosine similarity computation may measure the angular relationship between the generated content embedding and stored domain vectors, providing a normalized similarity score that ranges from negative one to positive one. The cosine similarity approach may focus on directional relationships between vectors rather than magnitude differences, enabling consistent similarity assessments regardless of embedding scale variations.

Domain vector storage within the knowledge base may organize evaluation contexts according to specialized knowledge areas, application domains, and content characteristics. In some cases, the knowledge base may contain domain vectors representing legal document analysis, medical content evaluation, financial report assessment, technical documentation review, and creative content analysis. Each domain vector may encode the characteristic patterns and evaluation priorities associated with specific knowledge areas or application contexts.

The cosine similarity calculation may involve computing the dot product of the normalized embedding vector and each domain vector, divided by the product of the vector magnitudes. In some cases, when both vectors are normalized to unit length, the cosine similarity may simplify to the dot product of the two vectors. The mathematical relationship may be expressed as the cosine of the angle between the vectors, where smaller angles indicate higher similarity and larger angles indicate lower similarity.

Weight adjustment mechanisms may translate similarity scores into criterion weight modifications that reflect the relevance of different evaluation dimensions for the specific content being assessed. In some cases, high similarity between the generated embedding and a legal domain vector may increase the weights assigned to factual accuracy, compliance checking, and logical consistency criteria while reducing emphasis on creative expression or stylistic variation measures. The weight adjustment process may ensure that evaluation emphasis aligns with domain-specific quality standards and risk factors.

Multiple domain vector matching may enable the system to handle content that spans multiple knowledge areas or application contexts. In some cases, the weight determination process may compute similarity scores for all stored domain vectors and combine the results to produce composite weight adjustments that reflect multiple relevant evaluation contexts. The multi-domain approach may accommodate interdisciplinary content or applications that require evaluation across multiple specialized areas.

For example, when evaluating a legal contract generated by an AI system, the embedding similarity analysis may identify high cosine similarity (0.92) with the legal domain vector stored in the knowledge base. This similarity score may trigger domain-specific weight adjustments that emphasize criteria most relevant to legal document evaluation while de-emphasizing less critical dimensions for this context.

| Evaluation Criterion | Base Weight | Legal Domain Adjustment | Final Weight | Rationale |
|---|---|---|---|---|
| Factual Accuracy | 0.50 | +0.40 | 0.90 | Legal documents require precise factual statements and accurate citations |
| Logical Consistency | 0.40 | +0.35 | 0.75 | Legal reasoning must follow logical structure and avoid contradictions |
| Compliance Checking | 0.30 | +0.55 | 0.85 | Legal content must adhere to regulatory requirements and standards |
| Bias Detection | 0.45 | +0.25 | 0.70 | Legal documents should maintain neutrality and avoid discriminatory language |
| Coherence | 0.35 | +0.25 | 0.60 | Legal text requires clear structure and comprehensible organization |
| Creative Expression | 0.40 | −0.28 | 0.12 | Legal documents prioritize precision over creative language |
| Stylistic Variation | 0.30 | −0.22 | 0.08 | Legal writing follows established conventions rather than stylistic diversity |
| Robustness | 0.50 | +0.15 | 0.65 | Legal content should quality across different interpretation contexts |

The weight adjustment process may ensure that evaluation emphasis aligns with domain-specific quality standards and risk factors. In some cases, the legal domain context may significantly increase weights for factual accuracy (0.90), compliance checking (0.85), and logical consistency (0.75) while substantially reducing emphasis on creative expression (0.12) and stylistic variation (0.08) that may be less relevant or potentially problematic in legal documentation contexts.

Threshold-based similarity filtering may enable the system to focus weight adjustments on domain vectors that exceed minimum similarity requirements. In some cases, the weight determination process may ignore domain vectors with cosine similarity scores below specified thresholds, concentrating evaluation emphasis on the most relevant domain contexts. The threshold filtering may prevent weak similarity relationships from introducing inappropriate evaluation biases or conflicting criterion weightings.

Threshold-based similarity filtering may enable the system to focus weight adjustments on domain vectors that exceed minimum similarity requirements. In some cases, the weight determination process may ignore domain vectors with cosine similarity scores below specified thresholds, concentrating evaluation emphasis on the most relevant domain contexts. The threshold filtering may prevent weak similarity relationships from introducing inappropriate evaluation biases or conflicting criterion weightings.

Weighted combination strategies may enable the system to blend criterion weights from multiple relevant domain vectors according to their respective similarity scores. In some cases, the weight determination process may compute weighted averages of criterion weights where the contribution of each domain vector is proportional to the cosine similarity score between the generated embedding and the domain vector. The weighted combination approach may produce criterion weightings that reflect the relative relevance of different domain contexts for the specific content being evaluated.

Dynamic weight scaling may adjust the magnitude of weight modifications based on the strength of similarity relationships and the confidence of domain matching. In some cases, the system may apply larger weight adjustments when similarity scores indicate strong domain alignment and smaller adjustments when similarity relationships are weaker or more ambiguous. The scaling approach may ensure that weight modifications reflect the certainty of domain identification and the reliability of similarity-based matching.

Criterion-specific weight adjustment patterns may enable different evaluation dimensions to respond differently to domain similarity relationships. In some cases, factual accuracy criteria may receive substantial weight increases when content similarity indicates technical or scientific domains, while creativity criteria may receive weight increases for artistic or marketing domain matches. The criterion-specific approach may ensure that weight adjustments align with the evaluation priorities associated with different domain contexts.

Temporal weight adaptation may enable the system to modify criterion weights based on time-dependent domain characteristics or evolving evaluation requirements. In some cases, the weight determination process may incorporate temporal factors that adjust domain vector relevance based on content freshness requirements, regulatory changes, or evolving quality standards within specific domains. The temporal adaptation may ensure that evaluation emphasis remains current and appropriate for time-sensitive content evaluation scenarios.

Hierarchical domain organization may enable the system to apply weight adjustments at multiple levels of domain specificity. In some cases, the knowledge base may organize domain vectors in hierarchical structures where general domain categories contain specialized subdomain vectors. The weight determination process may compute similarity scores at multiple hierarchy levels and apply weight adjustments that reflect both broad domain alignment and specific subdomain relevance.

User-defined domain vectors may enable organizations to customize weight determination processes according to specialized evaluation requirements or proprietary quality standards. In some cases, the system may incorporate user-provided domain vectors that represent organization-specific evaluation contexts, industry-specific quality criteria, or application-specific assessment priorities. The custom domain integration may enable tailored weight determination processes that align with particular business requirements or regulatory standards.

Similarity score normalization may ensure that weight adjustments remain consistent across different domain vector configurations and embedding characteristics. In some cases, the weight determination process may apply normalization techniques that account for variations in domain vector distributions, embedding dimensionality, or similarity score ranges. The normalization approach may enable stable weight determination behavior regardless of knowledge base configuration changes or embedding model updates.

Confidence-weighted similarity assessment may incorporate uncertainty measures into the weight determination process to account for ambiguous domain matching scenarios. In some cases, the system may compute confidence scores that reflect the reliability of similarity measurements and adjust criterion weights accordingly. The confidence weighting may reduce the influence of uncertain domain matches while emphasizing weight adjustments based on reliable similarity relationships.

Interactive weight calibration may enable users to review and modify automatically determined criterion weights when domain expertise or specific requirements warrant manual adjustment. In some cases, the system may present similarity-based weight recommendations alongside alternative weighting configurations, allowing users to select or customize evaluation emphasis based on their understanding of particular quality requirements. The interactive approach may combine algorithmic efficiency with human judgment to optimize evaluation effectiveness for specific assessment scenarios.

The system may implement neural network scoring processes to evaluate generative artificial intelligence outputs across multiple quality dimensions using a large-scale neural architecture trained on diverse evaluation datasets. The neural network scoring functionality may enable the system to generate quantitative assessments and qualitative rationales for various evaluation criteria, providing comprehensive analysis of AI-generated content quality and reliability.

The processor may be configured for applying a neural network, trained on benchmark and enterprise-annotated data, to generate per-criterion scores and pass-fail rationales. In some cases, the neural network application process may involve feeding the contextualized generative AI output through the trained model along with dynamically generated prompts that specify the evaluation criteria and weighting parameters determined through the embedding similarity analysis. The neural network may process the input content and evaluation specifications to produce both numerical scores and explanatory text that justifies the assessment results.

The neural network may comprise thirty billion parameters, representing a large-scale architecture that enables comprehensive analysis of complex generative AI outputs across multiple modalities and evaluation dimensions. In some cases, the thirty billion parameter configuration may provide the computational capacity to analyze nuanced quality characteristics such as subtle bias indicators, complex logical reasoning patterns, and sophisticated factual accuracy requirements that smaller models may not detect reliably. The parameter scale may enable the network to maintain detailed representations of evaluation criteria while processing diverse content types and domain contexts.

The neural network training process may involve fine-tuning in two sequential passes that establish both canonical evaluation capabilities and domain-specific assessment skills. In some cases, the two-stage training approach may ensure that the network develops robust evaluation foundations while adapting to real-world application requirements and business-specific quality standards. The sequential training methodology may enable the system to bridge academic evaluation benchmarks with practical deployment scenarios.

The first fine-tuning pass may involve training on item-rationale sets drawn from one or more publicly available evaluation suites to establish canonical scoring dimensions comprising one or more of factual accuracy, coherence, reasoning quality, harmfulness, bias, and robustness. In some cases, the publicly available evaluation suites may include collections of benchmark tasks, example inputs, corresponding expected outputs or rationales, and scoring protocols for one or more quality dimensions. The first training pass may expose the neural network to standardized evaluation scenarios that represent widely accepted quality assessment practices across the artificial intelligence research community.

The evaluation suites utilized during the first training pass may include datasets such as HELM, BIG-Bench, TruthfulQA, and alike that provide comprehensive coverage of different evaluation dimensions and content types. In some cases, these benchmark datasets may contain thousands or millions of annotated examples that demonstrate appropriate scoring patterns for various quality criteria. The benchmark training may enable the network to learn fundamental evaluation principles that apply across different domains and application contexts.

The second fine-tuning pass may involve training on examples drawn from business workflows, where the examples comprise one or more of customer-support transcripts, policy-draft revisions, marketing copy, code-review snippets, synthetic image captions, audio help-desk conversations, and social media posts annotated with evaluation criteria and pass-fail rationales. In some cases, the business workflow training data may represent real-world application scenarios where generative AI outputs are deployed in production environments. The enterprise-annotated data may provide the network with practical evaluation experience that addresses business-specific quality requirements and operational constraints.

The business workflow training examples may include domain-specific annotation that reflects organizational quality standards, regulatory compliance requirements, and industry-specific evaluation priorities. In some cases, customer-support transcript evaluation may emphasize accuracy, helpfulness, and tone appropriateness, while legal document assessment may prioritize factual precision, logical consistency, and regulatory compliance. The enterprise training phase may enable the network to adapt canonical evaluation principles to specific business contexts and quality expectations.

The neural network may be dynamically prompted at runtime with determined weights of the one or more criteria for evaluating the GenAI output, generating numeric scores and natural-language rationales for each criterion. In some cases, the dynamic prompting process may involve constructing evaluation requests that specify the relative importance of different quality dimensions based on the embedding similarity analysis and domain vector matching results. The runtime prompting approach may enable the same neural network to function as a multi-head scorer that adapts evaluation emphasis according to content characteristics and evaluation context.

The dynamic prompting mechanism may involve generating structured prompts that include the generative AI output content, the evaluation criteria specifications, the criterion weights determined through similarity analysis, and any domain-specific evaluation guidelines retrieved from the knowledge base. In some cases, the prompt construction process may format the evaluation request to maximize the neural network's ability to focus on relevant quality dimensions while maintaining consistency across different evaluation scenarios. The prompting approach may enable flexible evaluation configuration without requiring separate model training for different assessment contexts.

The per-criterion scoring process may generate numeric scores and natural-language rationales for each evaluation dimension specified in the weighted metric profile. In some cases, the numeric scores may represent quantitative assessments on standardized scales that enable comparison across different content types and evaluation sessions. The natural-language rationales may provide explanatory text that describes the reasoning behind each score assignment, identifying specific content characteristics that contribute to quality assessments and highlighting areas where improvements may be beneficial.

The neural network scoring process may provide detailed analysis that enables users to understand both the overall quality assessment and specific areas requiring attention or improvement. In some cases, the scoring results may indicate that while the legal contract demonstrates strong performance in most evaluation dimensions, certain aspects such as compliance checking and robustness may benefit from additional review or modification to enhance document quality and legal effectiveness.

The neural network scoring process may provide detailed analysis that enables users to understand both the overall quality assessment and specific areas requiring attention or improvement. In some cases, the scoring results may indicate that while the legal contract demonstrates strong performance in most evaluation dimensions, certain aspects such as compliance checking and robustness may benefit from additional review or modification to enhance document quality and legal effectiveness.

The per-criterion scores may be generated for factual accuracy, coherence, bias, and robustness, representing fundamental quality dimensions that apply across diverse generative AI applications. In some cases, the factual accuracy scoring may assess the correctness of factual claims, the reliability of information sources, and the accuracy of quantitative data presented in the generated content. The coherence evaluation may analyze logical consistency, narrative flow, structural organization, and the clarity of communication within the generated output.

Factual accuracy assessment may involve cross-referencing claims made in the generative AI output against reliable information sources, evaluating the precision of numerical data, and identifying potential misinformation or unsubstantiated assertions. In some cases, the neural network may analyze the confidence levels associated with factual claims, the presence of appropriate qualifiers or uncertainty indicators, and the overall reliability of information presented in the generated content. The factual accuracy scoring may produce numerical ratings that reflect the degree of factual correctness along with rationales that identify specific claims requiring verification or correction.

For example, when evaluating a legal contract generated by an AI system, the neural network scoring process may produce detailed per-criterion assessments that demonstrate the system's analytical capabilities across multiple quality dimensions. In some cases, the legal contract evaluation may yield the following comprehensive scoring results that illustrate both the quantitative assessments and qualitative reasoning provided by the neural network:

| Evaluation Criterion | Score | Neural Network Rationale |
|---|---|---|
| Factual Accuracy | 0.85/1.0 | Strong accuracy with precise statute citations and legal precedents. Jurisdictional references and penalty calculations require verification. |
| Coherence | 0.78/1.0 | Good logical flow and consistent terminology. Some clause transitions could be improved for clarity. |
| Bias Detection | 0.72/1.0 | Reasonable neutrality with balanced party interests. Dispute resolution clauses may favor one party. |
| Robustness | 0.68/1.0 | Moderate robustness across scenarios. Edge cases and force majeure conditions need additional specification. |

Factual accuracy assessment may involve cross-referencing claims made in the generative AI output against reliable information sources, evaluating the precision of numerical data, and identifying potential misinformation or unsubstantiated assertions. In some cases, the neural network may analyze the confidence levels associated with factual claims, the presence of appropriate qualifiers or uncertainty indicators, and the overall reliability of information presented in the generated content. The factual accuracy scoring may produce numerical ratings that reflect the degree of factual correctness along with rationales that identify specific claims requiring verification or correction.

Coherence evaluation may analyze the logical structure, narrative consistency, and communicative clarity of generative AI outputs across different content types and formats. In some cases, the coherence assessment may examine argument structure in persuasive text, narrative flow in creative content, procedural clarity in instructional material, and logical progression in analytical writing. The coherence scoring may evaluate both local coherence within individual sentences or paragraphs and global coherence across entire documents or presentations.

Bias detection and scoring may identify various forms of bias including demographic bias, cultural bias, political bias, and representational bias that may appear in generative AI outputs. In some cases, the bias evaluation may analyze language choices, representation patterns, assumption structures, and perspective limitations that may reflect unfair or inappropriate biases. The bias scoring process may assess both explicit bias indicators and subtle bias patterns that may not be immediately apparent but could influence audience perceptions or decision-making processes.

Robustness assessment may evaluate the stability and reliability of generative AI outputs under various conditions including input variations, prompt modifications, and contextual changes. In some cases, the robustness evaluation may analyze how consistently the generated content maintains quality standards when subjected to different evaluation scenarios or when compared against alternative generation approaches. The robustness scoring may assess the generalizability of content quality and the likelihood that similar generation requests would produce comparable results.

The evaluation agent within the chain-of-agents pipeline may coordinate the neural network scoring process as part of the comprehensive evaluation workflow. In some cases, the evaluation agent may receive contextualized content and evaluation specifications from the analysis agent and apply the neural network to generate per-criterion assessments. The evaluation agent may format the neural network outputs and pass the scoring results to subsequent agents in the pipeline for further processing and analysis.

The analysis agent may process and contextualize input data according to the evaluation plan, examining task complexity and domain-specific nuances that inform the neural network scoring process. In some cases, the analysis agent may calibrate evaluation parameters based on domain complexity and user priorities, adapting thresholds for different modalities and spawning specialized sub-checks such as advanced bias detection when content characteristics warrant additional scrutiny. The analysis agent may provide the evaluation agent with processed content and evaluation specifications that optimize neural network performance.

The critique agent may perform final quality checks to verify that evaluation outcomes are consistent, reproducible, and aligned with predefined standards. In some cases, the critique agent may review the neural network scoring results to ensure that per-criterion scores and rationales demonstrate internal consistency and align with established evaluation principles. The critique agent may consolidate results across cognitive tasks, generate user-facing structured feedback, and verify the reproducibility and interpretability of neural network assessments.

The evaluation pipeline may follow a structured workflow where each agent performs specialized functions and sequentially hands over processed output to the next agent. In some cases, the neural network scoring process may occur within the evaluation agent phase of the pipeline, receiving inputs from the planning and analysis agents while providing outputs to the error localizing and critique agents. The sequential workflow may ensure that neural network scoring occurs within an appropriate evaluation context and that scoring results receive proper validation and integration with other evaluation processes.

The neural network scoring process may accommodate multi-modal content evaluation by applying appropriate input processing techniques for different content types while maintaining consistent scoring methodologies across modalities. In some cases, the network may process text content through tokenization and embedding generation, image content through vision transformer processing, and audio content through acoustic feature extraction, while applying unified scoring criteria that enable cross-modal quality comparison. The multi-modal capability may enable comprehensive evaluation of complex generative AI outputs that combine multiple content types.

Batch processing capabilities may enable the neural network to evaluate multiple generative AI outputs simultaneously, improving computational efficiency and enabling comparative analysis across different generation attempts or model configurations. In some cases, the batch processing approach may facilitate statistical analysis of scoring patterns, identification of systematic quality issues, and benchmarking of generative model performance across large content collections. The batch evaluation capability may support both real-time assessment scenarios and retrospective analysis workflows.

The neural network scoring process may incorporate uncertainty quantification techniques that provide confidence estimates for per-criterion scores and rationales. In some cases, the uncertainty measures may indicate the reliability of scoring decisions and identify evaluation scenarios where additional human review or alternative assessment methods may be beneficial. The uncertainty quantification may enhance the interpretability of evaluation results and enable risk-aware decision-making based on neural network assessments.

Human-interpretable scoring explanations may enable users to understand the reasoning behind neural network assessments and identify specific content characteristics that influence quality scores. In some cases, the natural-language rationales may highlight particular words, phrases, or content elements that contribute to scoring decisions, enabling targeted content improvements and facilitating user understanding of evaluation criteria. The interpretability features may enhance user confidence in automated evaluation results and support educational applications where understanding evaluation reasoning provides learning value.

The system may implement error detection processes that identify quality violations and assessment failures through systematic comparison of neural network scoring results against predefined threshold values. The error detection functionality may enable the system to automatically identify criterion breaches and generate structured error records that facilitate targeted remediation and quality improvement efforts.

The processor may be configured for detecting a set of error stubs by comparing the per-criterion scores to corresponding thresholds to identify one or more criterion breaches. In some cases, the error detection process may involve evaluating each per-criterion score generated by the neural network against threshold values that define acceptable quality levels for different evaluation dimensions. The comparison process may identify instances where generated content fails to meet established quality standards, enabling the system to flag problematic outputs and provide specific feedback about quality deficiencies.

The threshold comparison process may involve mathematical operations that determine whether per-criterion scores fall below minimum acceptable values or exceed maximum allowable values for different quality dimensions. In some cases, factual accuracy scores below 0.7 on a normalized scale may trigger error stub generation, while bias scores above 0.3 may indicate unacceptable bias levels that warrant flagging. The threshold-based detection approach may enable consistent quality assessment across different content types and evaluation scenarios.

Dynamic threshold adjustment may enable the system to adapt error detection sensitivity based on domain context, content type, and application requirements. In some cases, medical content evaluation may employ stricter factual accuracy thresholds than creative writing assessment, while customer-facing content may utilize more stringent bias detection thresholds than internal documentation evaluation. The adaptive threshold approach may ensure that error detection aligns with domain-specific quality standards and risk tolerance levels.

The error stub creation process may generate structured data records that capture comprehensive information about detected quality violations. In some cases, the error stubs may comprise a criterion identifier, a breached threshold, an actual score, and a rationale pointer, and the error stubs may be stored in a structured record format that enables efficient processing and analysis. The structured approach may facilitate automated error handling, statistical analysis of quality patterns, and integration with downstream remediation processes.

An error stub is typically serialized as a small structured record (for example, a JSON object or a database row) with the following fields:

```
{
    "output_id": "string",//Unique identifier for the evaluated
        output
    "criterion_id": "string",//Identifier of the evaluation rule
        (e.g. "factual_accuracy")
    "actual_score": number,//Numeric score produced by the
        model
    "threshold": number,//Threshold value that was violated
    "rationale_pointer": "string",//Reference or URI to the
        model's natural-language rationale
    "severity": "string",//e.g. "warning" or "failure" "time-
        stamp":
    "ISO8601 string"//When the error was recorded
}
```

The criterion identifier component of error stubs may specify which evaluation dimension triggered the error detection, enabling targeted analysis and remediation efforts. In some cases, criterion identifiers may include values such as "factual_accuracy," "coherence," "bias_detection," "robustness," or "harmfulness" that correspond to the evaluation dimensions assessed by the neural network. The identifier specification may enable the system to categorize errors according to quality dimension and facilitate specialized handling procedures for different types of quality violations.

The breached threshold component may record the specific threshold value that was violated during the comparison process, providing context for the severity of the quality issue. In some cases, the breached threshold information may indicate whether the violation represents a minor quality concern or a major compliance failure that requires immediate attention. The threshold documentation may enable users to understand the quality standards applied during evaluation and assess the significance of detected violations.

The actual score component may capture the specific per-criterion score generated by the neural network that triggered the error detection, enabling precise quantification of quality deviations. In some cases, the actual score information may facilitate statistical analysis of quality patterns, trend identification, and comparative assessment across different content samples or generation attempts. The score documentation may provide objective measures of quality performance that support data-driven improvement efforts.

The rationale pointer component may reference the natural-language explanation generated by the neural network that describes the reasoning behind the quality assessment. In some cases, the rationale pointer may link to detailed explanatory text that identifies specific content characteristics contributing to the quality violation, enabling users to understand the nature of detected problems and develop targeted remediation strategies. The rationale integration may enhance the interpretability of error detection results and facilitate educational applications where understanding evaluation reasoning provides learning value.

The structured record storage approach may organize error stub information in standardized formats that enable efficient data processing, analysis, and integration with external systems. In some cases, the structured records may utilize formats such as JSON, XML, or database schemas that facilitate automated processing and enable integration with quality management systems, reporting tools, and remediation workflows. The standardized storage approach may ensure consistency across different evaluation sessions and enable long-term analysis of quality trends.

Error stub aggregation processes may enable the system to identify patterns and trends across multiple quality violations, facilitating systematic quality improvement efforts. In some cases, the aggregation analysis may reveal recurring error types, common failure modes, or systematic quality issues that affect multiple content samples or generation attempts. The pattern identification capability may enable proactive quality management and targeted model improvement efforts.

The outlier detection module may use dynamic evaluation strategies triggered when output falls outside known parameters or deviates from expected norms. In some cases, the outlier detection functionality may identify unusual content characteristics, unexpected quality patterns, or anomalous scoring results that warrant additional scrutiny or specialized handling procedures. The dynamic evaluation approach may enable the system to adapt error detection strategies based on content characteristics and evaluation context.

Outlier detection may involve statistical analysis of per-criterion scores relative to historical distributions, expected value ranges, and typical quality patterns observed in similar content types. In some cases, the outlier identification process may flag content that exhibits score combinations or quality patterns that differ substantially from established norms, indicating potential generation errors, model failures, or unusual content characteristics. The statistical approach may enable automated identification of content that requires additional review or specialized evaluation procedures.

The dynamic evaluation strategies may modify error detection thresholds, adjust criterion weightings, or invoke additional evaluation procedures when outlier conditions are detected. In some cases, the system may apply more stringent factual accuracy checking when content contains unusual claims, increase bias detection sensitivity when content addresses sensitive topics, or activate specialized evaluation modules when content exhibits characteristics associated with known failure modes. The adaptive response capability may ensure robust error detection even when encountering unexpected or unusual generative AI outputs.

Error stub prioritization mechanisms may enable the system to rank detected quality violations according to severity, impact, or urgency considerations. In some cases, the prioritization process may assign higher priority to errors that affect safety-critical applications, violate regulatory requirements, or impact user-facing content quality. The priority assignment may facilitate efficient allocation of remediation resources and ensure that the most significant quality issues receive appropriate attention.

Batch error detection capabilities may enable the system to process multiple generative AI outputs simultaneously and identify systematic quality issues that affect multiple content samples. In some cases, the batch processing approach may reveal error patterns that span multiple generation attempts, indicate model-level quality issues, or suggest systematic problems with generation parameters or training data. The batch analysis capability may support quality assurance workflows and enable comprehensive assessment of generative model performance.

Real-time error detection may enable the system to identify quality violations as generative AI outputs are produced, facilitating immediate feedback and intervention when quality issues are detected. In some cases, the real-time capability may enable the system to halt generation processes when severe quality violations are detected, request regeneration when quality standards are not met, or provide immediate feedback to users about content quality concerns. The real-time detection approach may prevent low-quality content from reaching production environments and enable responsive quality management.

Error stub validation processes may verify the accuracy and reliability of detected quality violations through additional analysis or human review procedures. In some cases, the validation approach may involve cross-referencing error detection results with alternative evaluation methods, soliciting expert review of flagged content, or applying additional quality checks to confirm the validity of detected violations. The validation capability may reduce false positive error detection and ensure that remediation efforts focus on genuine quality issues.

Human-in-the-loop error review may enable domain experts to evaluate detected quality violations and provide feedback about error detection accuracy and relevance. In some cases, the human review process may involve presenting error stubs alongside the original content and neural network rationales, allowing experts to assess whether detected violations represent genuine quality concerns or evaluation system limitations. The human feedback may inform error detection threshold adjustments and improve the accuracy of automated quality assessment processes.

Error stub export capabilities may enable the system to provide detected quality violations to external systems, reporting tools, or quality management platforms. In some cases, the export functionality may generate standardized reports, data feeds, or API responses that integrate error detection results with broader quality assurance workflows. The integration capability may enable organizations to incorporate automated quality assessment into existing quality management processes and leverage error detection results for continuous improvement efforts.

The system may implement error localization processes that identify specific positions within generative artificial intelligence outputs where quality violations occur, enabling targeted remediation and precise feedback about content deficiencies. The error localization functionality may enable the system to pinpoint exact locations of detected problems rather than providing general quality assessments, facilitating efficient content improvement and user understanding of evaluation results.

The processor may be configured for localizing one or more error positions within the output based on the set of error stubs. In some cases, the error localization process may analyze the error stub information to determine which portions of the generated content contributed to quality violations and apply modality-specific techniques to identify precise locations where problems occur. The localization approach may enable the system to provide granular feedback that guides users to specific content elements requiring attention or modification.

Text error localization may involve projecting attention maps onto text tokens to identify specific words, phrases, or sentences that contribute to quality violations. In some cases, the attention map projection process may utilize the neural network's internal attention mechanisms to trace scoring decisions back to individual tokens or token sequences within the generated text. The attention analysis may reveal which textual elements received the highest attention weights during evaluation and correlate these attention patterns with detected quality issues.

The attention map projection process may involve extracting attention weights from the neural network's transformer layers and mapping these weights to corresponding token positions within the input text. In some cases, the projection analysis may identify tokens with the highest negative contribution to failing scores, enabling the system to group contiguous spans of problematic text and provide precise location information to users. The token-level analysis may enable identification of specific words or phrases responsible for factual inaccuracies, coherence problems, or bias indicators.

Attention weight aggregation techniques may combine attention information across multiple neural network layers and attention heads to produce comprehensive localization results. In some cases, the aggregation process may weight attention contributions according to their relevance to specific evaluation criteria, emphasizing attention patterns that correlate with detected quality violations. The multi-layer analysis may provide robust localization results that account for different levels of linguistic processing within the neural network architecture.

Token span identification may group individual problematic tokens into contiguous text segments that represent coherent error regions within the generated content. In some cases, the span identification process may apply clustering algorithms or proximity analysis to merge adjacent problematic tokens into meaningful text segments such as phrases, sentences, or paragraphs. The span grouping approach may provide users with actionable feedback about text regions requiring revision rather than isolated word-level corrections.

Image error localization may involve selecting masks with maximum rule-violation gradients to identify specific visual regions that contribute to quality assessment failures. In some cases, the gradient analysis process may compute the derivative of evaluation scores with respect to different image regions, identifying areas where small changes would produce the largest improvements in quality assessments. The gradient-based approach may enable precise identification of problematic visual elements within generated images.

The mask selection process may involve dividing generated images into spatial regions or object-based segments and computing rule-violation gradients for each region independently. In some cases, the segmentation approach may utilize object detection algorithms, semantic segmentation techniques, or grid-based partitioning to create meaningful image regions for gradient analysis. The regional analysis may enable identification of specific objects, backgrounds, or compositional elements that contribute to quality violations.

Object-masking head utilization may involve leveraging specialized neural network components that retain intermediate feature maps during the evaluation process. In some cases, the object-masking heads may provide spatial attention information that indicates which image regions received the highest focus during quality assessment. The feature map analysis may enable correlation between visual attention patterns and detected quality issues, facilitating precise localization of problematic image content.

Bounding box coordinate generation may provide users with precise spatial information about error locations within generated images. In some cases, the localization process may output rectangular coordinates that define the boundaries of problematic visual regions, enabling users to identify specific areas requiring modification or regeneration. The coordinate information may facilitate automated image editing workflows or provide clear guidance for manual image correction efforts.

Audio and video error localization may involve identifying time windows exceeding violation likelihood thresholds to pinpoint temporal segments where quality issues occur. In some cases, the temporal analysis process may divide audio or video content into overlapping time segments and evaluate each segment independently to identify periods where quality violations are most pronounced. The time-based approach may enable precise identification of problematic audio segments or video frames within longer content sequences.

Dynamic time window analysis may adapt segment boundaries based on content characteristics and detected error patterns. In some cases, the windowing approach may utilize variable-length segments that align with natural content boundaries such as sentence breaks in speech, musical phrases in generated audio, or scene transitions in video content. The adaptive segmentation may provide more meaningful temporal localization results that correspond to perceptually relevant content units.

Violation likelihood computation may involve statistical analysis of quality scores across temporal segments to identify periods where error probability exceeds acceptable thresholds. In some cases, the likelihood analysis may incorporate confidence measures from the neural network evaluation process and apply statistical techniques to identify time windows where quality violations are most probable. The statistical approach may enable robust temporal localization that accounts for uncertainty in quality assessments.

Time code recording may provide users with precise temporal coordinates that specify when quality violations occur within audio or video content. In some cases, the localization process may generate start and end timestamps that define problematic temporal segments, enabling users to navigate directly to error locations within media content. The temporal coordinate information may facilitate targeted editing workflows and provide clear guidance for content remediation efforts.

Multi-modal error localization may address content types that combine multiple modalities within single outputs, such as video content with audio tracks or documents containing embedded images. In some cases, the localization process may coordinate text, image, and temporal localization techniques to provide comprehensive error location information across all content modalities. The integrated approach may enable identification of cross-modal consistency issues and provide complete feedback about quality violations.

Cross-modal correlation analysis may identify relationships between error locations across different modalities within the same content output. In some cases, the correlation analysis may reveal that text errors correspond to specific image regions or that audio quality issues align with particular video segments. The cross-modal analysis may provide insights into systematic quality problems that affect multiple content dimensions simultaneously.

Hierarchical error localization may provide error location information at multiple levels of granularity, from coarse-grained content sections to fine-grained individual elements. In some cases, the hierarchical approach may identify problematic document sections, paragraphs, sentences, and individual words within text content, or problematic scenes, shots, and individual frames within video content. The multi-level localization may enable users to understand error context at different scales and choose appropriate remediation strategies.

Error severity mapping may correlate localization results with quality violation severity to prioritize remediation efforts. In some cases, the severity analysis may assign higher priority to error locations that correspond to more significant quality violations or that affect content elements with greater impact on overall quality. The priority mapping may enable efficient allocation of remediation resources and ensure that the most problematic content elements receive appropriate attention.

Confidence scoring for localization results may provide users with information about the reliability of error location identification. In some cases, the confidence measures may indicate whether localization results represent definitive error locations or approximate regions where quality issues may occur. The confidence information may enable users to assess the reliability of localization feedback and determine when additional analysis or human review may be beneficial.

Interactive error localization may enable users to explore error locations through visualization interfaces that highlight problematic content regions and provide detailed information about detected quality violations. In some cases, the interactive approach may present error locations alongside neural network rationales and quality scores, enabling users to understand the relationship between content characteristics and evaluation results. The visualization capability may enhance user comprehension of quality issues and facilitate effective content improvement efforts.

Automated error correction suggestions may leverage localization results to propose specific modifications that address detected quality violations. In some cases, the suggestion system may recommend alternative text for problematic phrases, propose image modifications for problematic visual regions, or suggest audio edits for problematic temporal segments. The automated suggestion capability may accelerate content improvement workflows and provide users with concrete guidance for addressing quality issues.

Error localization validation may verify the accuracy of identified error positions through additional analysis or comparison with alternative localization methods. In some cases, the validation process may involve cross-referencing localization results with human expert assessments, applying alternative localization algorithms, or conducting sensitivity analysis to assess the stability of error location identification. The validation approach may ensure that localization feedback accurately reflects genuine quality issues and provides reliable guidance for content improvement efforts.

Human-interpretable localization reporting may present error location information in formats that enable users to understand and act upon localization results effectively. In some cases, the reporting approach may generate visual overlays for images, highlighted text for documents, or timeline annotations for audio and video content that clearly indicate error locations and associated quality concerns. The interpretable presentation may enhance user understanding of evaluation results and facilitate efficient content remediation workflows.

The system may implement knowledge base updating processes that incorporate detected error stubs to enhance evaluation accuracy and adapt to emerging quality patterns in generative artificial intelligence outputs. The knowledge base updating functionality may enable the system to learn from evaluation experiences and refine assessment capabilities through systematic analysis of detected quality violations and evaluation outcomes.

The processor may be configured for updating the knowledge base based on the detected error stubs to continuously improve GenAI output evaluation process, wherein the knowledge base is updated by one or more of adding newly detected error patterns, adjusting weights of domain-specific evaluation rules, and revising threshold for subsequent evaluations.

The system may implement comprehensive report generation processes that consolidate evaluation results into structured documents containing error analysis, localization information, and actionable recommendations for content improvement. The report generation functionality may enable the system to present evaluation outcomes in formats that facilitate user understanding, support decision-making processes, and guide remediation efforts for generative artificial intelligence outputs.

The system may be configured for generating an evaluation report comprising the error stubs, localized error positions, and associated pass-fail rationales. In some cases, the evaluation report generation process may aggregate information from multiple evaluation stages including neural network scoring, error detection, and localization analysis to produce comprehensive assessments of generative AI output quality. The report compilation may organize evaluation results according to quality dimensions, severity levels, and content modalities to enable efficient review and analysis of assessment outcomes.

The evaluation report structure may include detailed sections that present error stub information in organized formats that facilitate understanding of detected quality violations. In some cases, the error stub presentation may group violations according to evaluation criteria such as factual accuracy, coherence, bias detection, and robustness, enabling users to focus on specific quality dimensions during review processes. The structured organization may enable systematic analysis of quality patterns and facilitate targeted improvement efforts for different evaluation criteria.

Error stub documentation within evaluation reports may present criterion identifiers, breached thresholds, actual scores, and rationale pointers in tabular or hierarchical formats that enable efficient information access. In some cases, the error stub presentation may include severity indicators that distinguish between minor quality concerns and major compliance violations, enabling users to prioritize remediation efforts according to impact and urgency considerations. The detailed error information may provide objective measures of quality performance that support data-driven improvement decisions.

Localized error position information may be integrated into evaluation reports through visual representations, coordinate specifications, and descriptive text that enables users to identify precise locations of quality violations within generated content. In some cases, text error localization may be presented through highlighted passages, annotated documents, or token-level markup that indicates problematic words, phrases, or sentences within generated text content. The visual presentation may enable rapid identification of content elements requiring attention or modification.

Image error localization within evaluation reports may utilize bounding box overlays, region highlighting, or spatial coordinate specifications that indicate problematic visual areas within generated images. In some cases, the image localization presentation may include thumbnail views with highlighted regions alongside detailed coordinate information that enables precise identification of visual elements contributing to quality violations. The spatial visualization may facilitate targeted image editing workflows and provide clear guidance for visual content improvement efforts.

Audio and video error localization may be presented through timeline annotations, temporal coordinate specifications, and waveform or frame-based visualizations that indicate problematic segments within media content. In some cases, the temporal localization presentation may include clickable timeline elements that enable users to navigate directly to error locations within audio or video content. The temporal visualization may facilitate efficient media editing workflows and provide precise guidance for content remediation efforts.

Pass-fail rationale integration within evaluation reports may present natural-language explanations generated by the neural network alongside corresponding quality scores and error locations. In some cases, the rationale presentation may organize explanatory text according to evaluation criteria and provide detailed descriptions of content characteristics that contribute to quality assessments. The explanatory information may enhance user understanding of evaluation reasoning and facilitate educational applications where comprehension of assessment logic provides learning value.

The evaluation report generation process may incorporate statistical analysis and trend identification that reveal patterns across multiple quality violations or evaluation sessions. In some cases, the statistical presentation may include frequency analysis of error types, distribution analysis of quality scores, and comparative analysis across different content samples or generation attempts. The analytical information may enable identification of systematic quality issues and support strategic improvement planning for generative AI systems.

Recommendation generation within evaluation reports may provide specific suggestions for addressing detected quality violations based on error analysis and localization results. In some cases, the recommendation system may propose alternative text for problematic phrases, suggest image modifications for problematic visual regions, or recommend audio edits for problematic temporal segments. The actionable recommendations may accelerate content improvement workflows and provide users with concrete guidance for addressing quality concerns.

The system may further comprise providing feedback through a software development kit integrated with an AI application to update model parameters based on the evaluation report. In some cases, the software development kit integration may enable automated feedback loops that incorporate evaluation results into model training processes, parameter adjustment workflows, and generation strategy modifications. The integration capability may facilitate continuous improvement of generative AI systems through systematic incorporation of quality assessment outcomes.

The software development kit may provide application programming interfaces that enable external systems to access evaluation reports, extract quality metrics, and implement automated responses to detected quality violations. In some cases, the API functionality may enable real-time integration of evaluation results into content generation workflows, allowing applications to modify generation parameters, request content regeneration, or apply content filtering based on quality assessment outcomes. The programmatic access may enable seamless integration of evaluation capabilities into existing AI application architectures.

Model parameter updating processes may utilize evaluation report information to identify specific aspects of generative models that require adjustment or refinement. In some cases, the parameter updating approach may analyze error patterns to determine which model components contribute to quality violations and apply targeted training or fine-tuning procedures to address identified deficiencies. The systematic parameter adjustment may enable data-driven model improvement that addresses specific quality concerns identified through evaluation processes.

The feedback integration may enable iterative model improvement cycles where evaluation results inform training data selection, loss function modifications, and architectural adjustments that enhance generative model performance. In some cases, the iterative approach may involve repeated evaluation and adjustment cycles that progressively improve model quality across multiple evaluation dimensions. The continuous improvement capability may enable generative AI systems to adapt to evolving quality standards and application requirements.

The system may further comprise monitoring generative artificial intelligence outputs in real time and adjusting evaluation thresholds based on model performance history. In some cases, the real-time monitoring capability may enable continuous assessment of generative AI outputs as content is produced, facilitating immediate detection of quality violations and enabling responsive quality management. The monitoring approach may prevent low-quality content from reaching production environments and enable proactive quality assurance workflows.

Real-time threshold adjustment may involve statistical analysis of quality score distributions and performance trends to identify optimal threshold values that balance detection sensitivity with false positive rates. In some cases, the threshold optimization process may analyze historical evaluation data to determine threshold settings that maximize detection accuracy while minimizing unnecessary quality alerts. The adaptive threshold approach may ensure that evaluation sensitivity remains appropriate as generative model capabilities evolve and quality patterns change.

Model performance history analysis may involve tracking quality trends across extended time periods to identify systematic changes in generative model behavior and output characteristics. In some cases, the historical analysis may reveal gradual quality degradation, emerging error patterns, or improvements in specific evaluation dimensions that warrant threshold adjustments. The trend analysis capability may enable proactive quality management that anticipates and responds to evolving model performance characteristics.

The real-time monitoring system may implement alert mechanisms that notify users or automated systems when quality violations exceed specified frequency thresholds or when unusual quality patterns are detected. In some cases, the alert functionality may enable immediate intervention when quality issues are identified, facilitating rapid response to quality concerns and preventing accumulation of problematic content. The notification capability may support both human oversight and automated quality management workflows.

The system may further comprise integrating a user-provided knowledge base into the knowledge base to adapt evaluation rules to domain-specific terminology. In some cases, the user-provided knowledge base integration may enable organizations to customize evaluation criteria according to specialized vocabulary, industry-specific quality standards, and proprietary assessment requirements. The customization capability may ensure that evaluation processes align with particular business contexts and regulatory environments.

User-provided knowledge base integration may involve importing domain glossaries, compliance rules, and quality standards that reflect organizational evaluation priorities and industry-specific requirements. In some cases, the integration process may involve mapping user-defined terminology to existing evaluation criteria and adjusting criterion weights according to organizational quality priorities. The customization approach may enable specialized evaluation workflows that address unique business requirements and regulatory compliance needs.

Domain-specific terminology adaptation may involve modifying evaluation algorithms to recognize and appropriately assess specialized vocabulary, technical terms, and industry-specific language patterns. In some cases, the terminology adaptation process may involve updating natural language processing components, adjusting bias detection algorithms, and modifying factual accuracy assessment procedures to account for domain-specific knowledge and communication patterns. The adaptation capability may ensure that evaluation results remain relevant and accurate within specialized application contexts.

The feedback agent may incorporate user feedback into the evaluation loop, allowing for iterative refinements and adjusting evaluation parameters. In some cases, the feedback agent may collect user assessments of evaluation accuracy, gather input about evaluation priorities, and receive guidance about domain-specific quality requirements that inform evaluation process improvements. The feedback incorporation may enable continuous refinement of evaluation methodologies based on user experience and domain expertise.

User feedback collection may involve presenting evaluation results alongside interfaces that enable users to indicate agreement or disagreement with assessment outcomes, provide alternative quality assessments, and suggest modifications to evaluation criteria or thresholds. In some cases, the feedback collection process may utilize rating systems, comment fields, and structured questionnaires that capture user perspectives about evaluation accuracy and relevance. The systematic feedback gathering may enable data-driven improvements to evaluation processes.

Iterative refinement processes may utilize accumulated user feedback to identify evaluation system limitations, adjust assessment algorithms, and modify evaluation criteria according to user preferences and domain requirements. In some cases, the refinement approach may involve statistical analysis of feedback patterns to identify systematic evaluation issues and implement targeted improvements that address user concerns. The iterative improvement capability may ensure that evaluation systems remain aligned with user expectations and application requirements.

Evaluation parameter adjustment may involve modifying criterion weights, threshold values, and assessment algorithms based on user feedback and evaluation outcome analysis. In some cases, the parameter adjustment process may utilize machine learning techniques that optimize evaluation configurations according to user satisfaction metrics and assessment accuracy measures. The adaptive parameter management may enable evaluation systems to evolve and improve through systematic incorporation of user guidance and performance feedback.

The user feedback interface may enable evaluation tailored to user's specific use case, adapting assessment criteria based on real-world application constraints. In some cases, the user feedback interface may provide configuration options that enable users to specify evaluation priorities, define custom quality criteria, and adjust assessment parameters according to particular application requirements. The customization capability may ensure that evaluation processes address specific user needs and application contexts.

Use case adaptation may involve analyzing user-specified requirements to determine appropriate evaluation strategies, criterion weightings, and assessment procedures that align with particular application scenarios. In some cases, the adaptation process may involve mapping user requirements to available evaluation capabilities and configuring assessment workflows that address specific quality concerns and performance objectives. The tailored approach may ensure that evaluation results provide relevant and actionable information for specific application contexts.

Real-world application constraint consideration may involve incorporating operational limitations, resource constraints, and performance requirements into evaluation configuration decisions. In some cases, the constraint consideration process may involve balancing evaluation thoroughness with computational efficiency requirements, adjusting assessment scope according to available processing resources, and optimizing evaluation workflows for specific deployment environments. The constraint-aware approach may ensure that evaluation systems remain practical and effective within real-world operational contexts.

The user feedback interface may provide visualization tools and interactive elements that enable users to explore evaluation results, understand assessment reasoning, and provide targeted feedback about specific evaluation outcomes. In some cases, the interface may include graphical representations of quality scores, interactive error localization displays, and structured feedback forms that facilitate efficient user interaction with evaluation systems. The interactive capability may enhance user engagement with evaluation processes and improve the quality of feedback provided to system improvement efforts.

Human-in-the-loop evaluation refinement may enable domain experts to review evaluation outcomes and provide specialized knowledge that improves assessment accuracy and relevance. In some cases, the expert review process may involve presenting evaluation results alongside domain-specific context information, enabling experts to assess whether evaluation outcomes align with professional standards and industry best practices. The expert input may inform evaluation system improvements and ensure that assessment processes remain current with evolving domain knowledge and quality standards.

Figure 2:
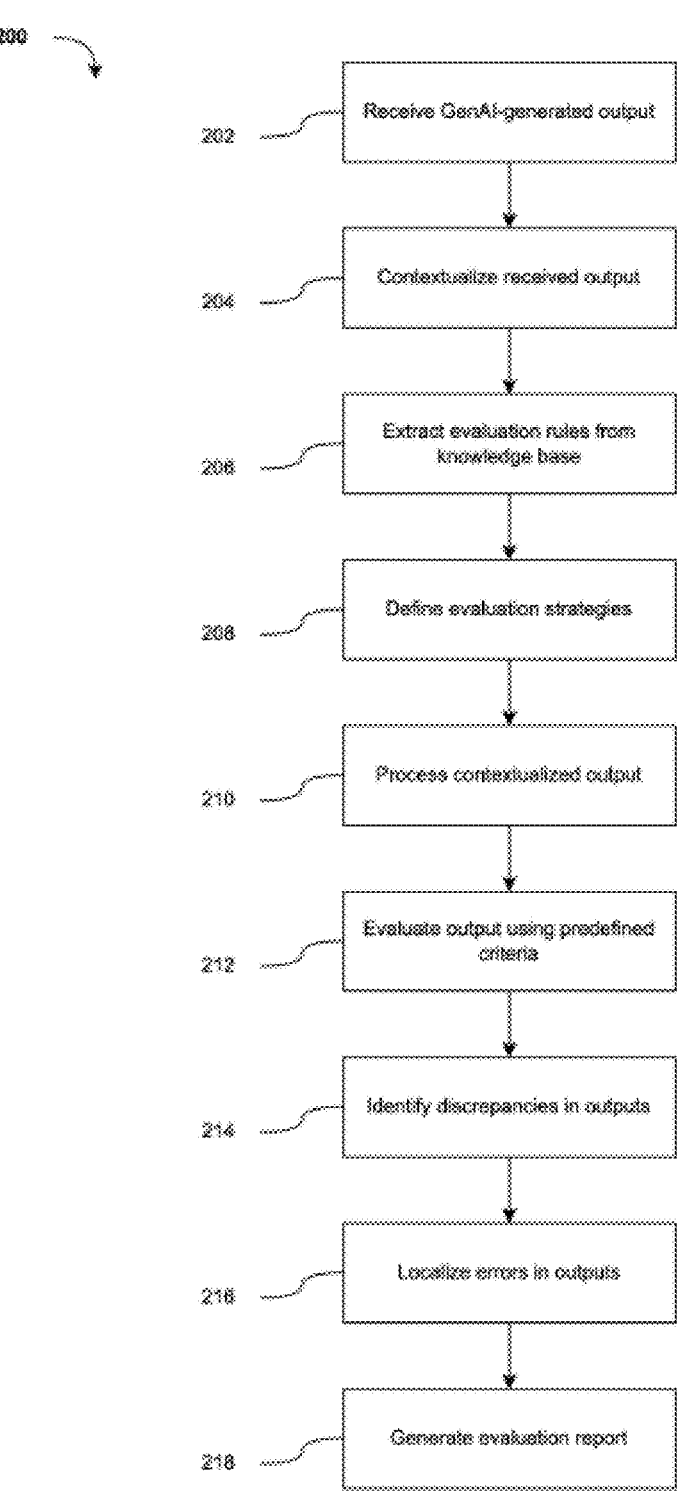
FIG. 2 is a flowchart of a method for detecting errors, hallucinations, and biases in outputs generated by generative artificial intelligence (GenAI) models.

Referring now to FIG. 2, a method 200 for detecting errors, hallucinations, and biases in outputs generated by generative artificial intelligence (GenAI) models is shown, in accordance with an embodiment of the present subject matter. The method 200 may be described in the general context of computer executable instructions. Generally, computer executable instructions can include routines, programs, objects, components, data structures, procedures, modules, functions, etc., that perform particular functions or implement particular abstract data types.

The order in which the method 200 is described is not intended to be construed as a limitation, and any number of the described method blocks can be combined in any order to implement the method 200 or alternate methods for detecting errors, hallucinations, and biases in outputs generated by generative artificial intelligence (GenAI) models. Additionally, individual blocks may be deleted from the method 200 without departing from the scope of the subject matter described herein. Furthermore, the method 200 for detecting errors, hallucinations, and biases in outputs generated by generative artificial intelligence (GenAI) models can be implemented in any suitable hardware, software, firmware, or combination thereof. However, for ease of explanation, in the embodiments described below, the method 200 may be considered to be implemented in the above-described system 102.

The evaluation process 200 may include multiple steps for evaluating generative AI outputs. In some cases, at step 202, GenAI-generated outputs may be received. The input processing module 202 may include a text input module 204, an image input module 206, an audio input module 208, and a video input module 210 for processing various types of inputs.

A contextualization module 212 may correlate the received outputs with metadata or usage scenarios. This correlation may provide context for subsequent evaluation steps.

In some cases, a rule extraction engine 214 may extract evaluation rules from a knowledge base. The knowledge base may contain domain-specific evaluation rules and historical error patterns. These rules may guide the evaluation process.

An evaluation pipeline 216 may define evaluation strategies based on the extracted rules and contextualized outputs. The evaluation pipeline 216 may then process the contextualized output and evaluate the output using pre-defined criteria.

In some cases, the evaluation pipeline 216 may identify discrepancies in the outputs by comparing them against the extracted evaluation rules. An outlier handler 218 may localize errors in the outputs by determining specific content that contributes to the discrepancies.

The evaluation process 200 may conclude with generating an evaluation report. This report may include details about the evaluation results, identified discrepancies, and localized errors.

Figure 3:
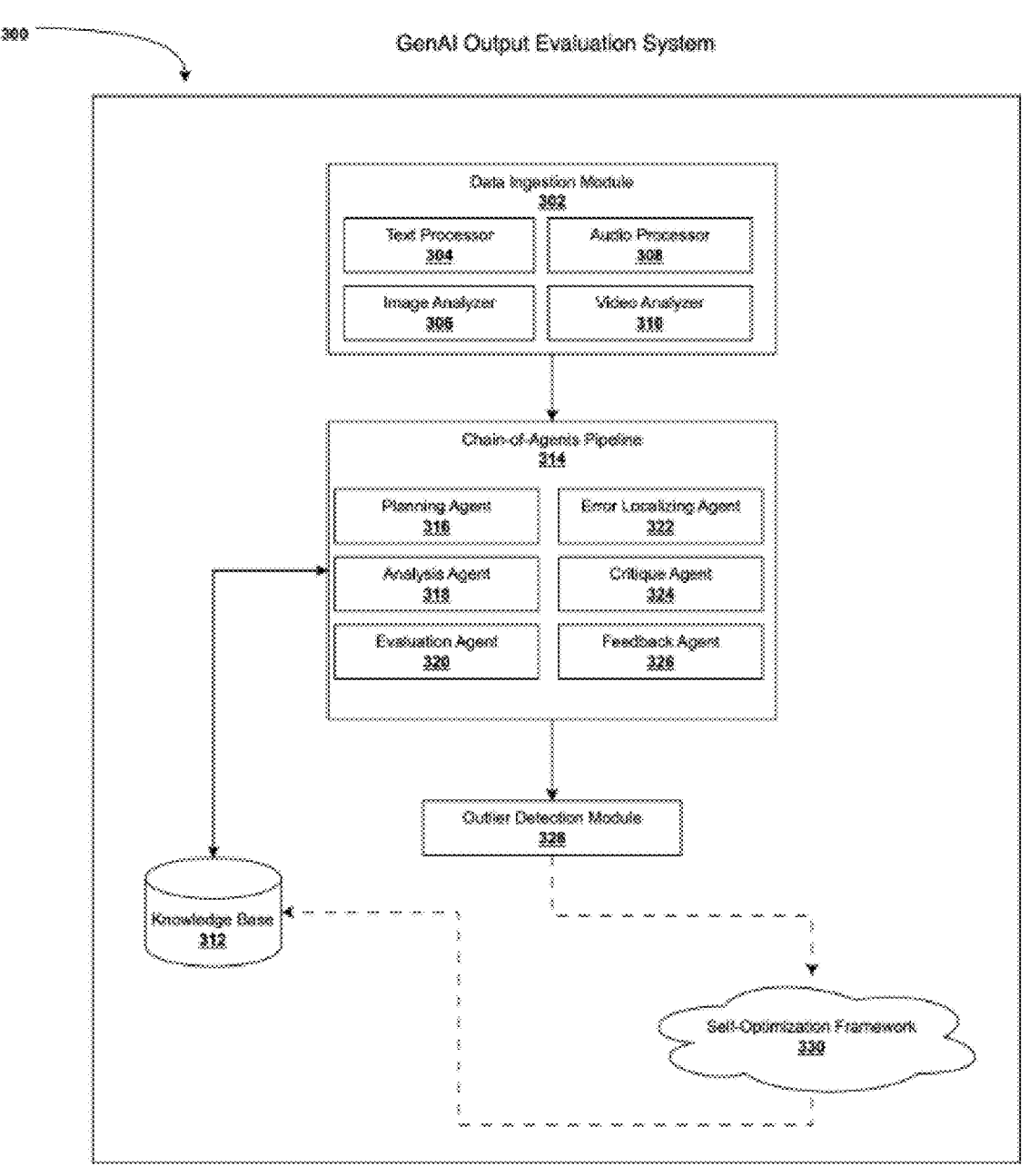
FIG. 3 is a block diagram of a GenAI output evaluation system.

FIG. 3 illustrates a block diagram of a GenAI output evaluation system 300. The evaluation system 300 may include a data ingestion module 302 configured to process multiple types of inputs. In some cases, the data ingestion module 302 may comprise a text processor 304, an image analyzer 306, an audio processor 308, and a video analyzer 310. These components may enable the evaluation system 300 to handle multi-modal inputs, allowing for comprehensive analysis of various data formats.

The evaluation system 300 may also include a knowledge base 312 that may store information used in the evaluation process. In some implementations, the knowledge base 312 may contain domain-specific rules, historical data, and evaluation criteria.

A chain-of-steps pipeline 314 may process the inputs from the data ingestion module 302. The pipeline 314 may include multiple specialized steps, each designed to perform specific tasks within the evaluation process. These steps may include a planning step 316, an analysis step 318, an evaluation step 320, an error localization step 322, a critique step 324, and a feedback step 326.

In some cases, the planning step 316 may define evaluation strategies and metrics. The analysis step 318 may process and contextualize input data. The evaluation step 320 may conduct core assessments based on predefined criteria. The error localization step 322 may identify and classify specific errors or inconsistencies in the output. The critique step 324 may perform quality checks and consolidate results. The feedback step 326 may incorporate user input and adjust evaluation parameters.

The evaluation system 300 may also include an outlier detection module 328 that may process outputs from the chain-of-steps pipeline 314. This module may be responsible for identifying and handling edge cases or unexpected results in the evaluation process.

A self-optimization framework 330 may receive information from the outlier detection module 328. In some implementations, the optimization framework 330 may use this information to refine and improve the evaluation process over time.

The components of the evaluation system 300 may be connected through various data flows. For example, the data ingestion module 302 may send processed inputs to the chain-of-steps pipeline 314. The chain-of-steps pipeline 314 may communicate with the knowledge base 312 to access stored information and rules. The outlier detection module 328 may connect to both the chain-of-steps pipeline 314 and the self-optimization framework 330, allowing for dynamic evaluation and continuous improvement of the system.

Figure 4:
FIG. 4 is a diagram of a multi-modal evaluation process for evaluating generative AI outputs.

FIG. 4 illustrates a multi-modal evaluation process 400 for evaluating generative AI outputs. The evaluation process 400 may include an input processing module 402 configured to receive and process multiple types of inputs. In some cases, the input processing module 402 may comprise a text input module 404, an image input module 406, an audio input module 408, and a video input module 410 for handling different data formats. These components may enable the evaluation process 400 to handle multi-modal inputs, allowing for comprehensive analysis of various data types.

The input processing module 402 may connect to a contextualization module 412, which may process the inputs with contextual information. In some implementations, the contextualization module 412 may analyze the input data in relation to its intended use or domain-specific requirements.

A rule extraction engine 414 may interface with external sources 422 to obtain evaluation rules and guidelines. The rule extraction engine 414 may be responsible for identifying and extracting relevant rules and constraints that will be applied during the evaluation process.

The evaluation process 400 may include an evaluation pipeline 416 that may receive input from both the contextualization module 412 and the rule extraction engine 414. The evaluation pipeline 416 may be responsible for conducting the core assessment of the generative AI outputs based on the contextualized inputs and extracted rules.

In some cases, the evaluation pipeline 416 may connect to an outlier handler 418, which may process any detected anomalies or deviations in the evaluation results. The outlier handler 418 may be designed to identify and manage edge cases or unexpected outputs that fall outside normal parameters.

The outlier handler 418 may feed into a knowledge base updater 420, which may maintain and update the system's knowledge repository. The knowledge base updater 420 may receive information from external sources 422 through the rule extraction engine 414. This integration may allow the evaluation process 400 to continuously refine and expand its knowledge base with new information and insights.

A user feedback interface 424 may connect to the knowledge base updater 420, allowing for user input to be incorporated into the evaluation process. The user feedback interface 424 may provide a means for users to interact with the system and contribute to the evaluation criteria.

The evaluation process 400 may support both predefined and customizable evaluation metrics. In some implementations, the evaluation pipeline 416 may utilize a set of standard metrics while also allowing for the integration of user-defined or domain-specific evaluation criteria through the user feedback interface 424.

The knowledge base may be integrated throughout the evaluation process 400 to supply domain rules, constraints, known failure modes, and best practices. For example, the rule extraction engine 414 may access the knowledge base to retrieve relevant evaluation criteria, while the knowledge base updater 420 may continuously refine and expand the stored information based on new insights and user feedback.

The components of the evaluation process 400 may be arranged in a hierarchical structure, with data flowing from the input processing module 402 through various processing stages to the knowledge base updater 420. This structure may allow for a systematic and comprehensive evaluation of generative AI outputs across multiple modalities.

Figure 5:
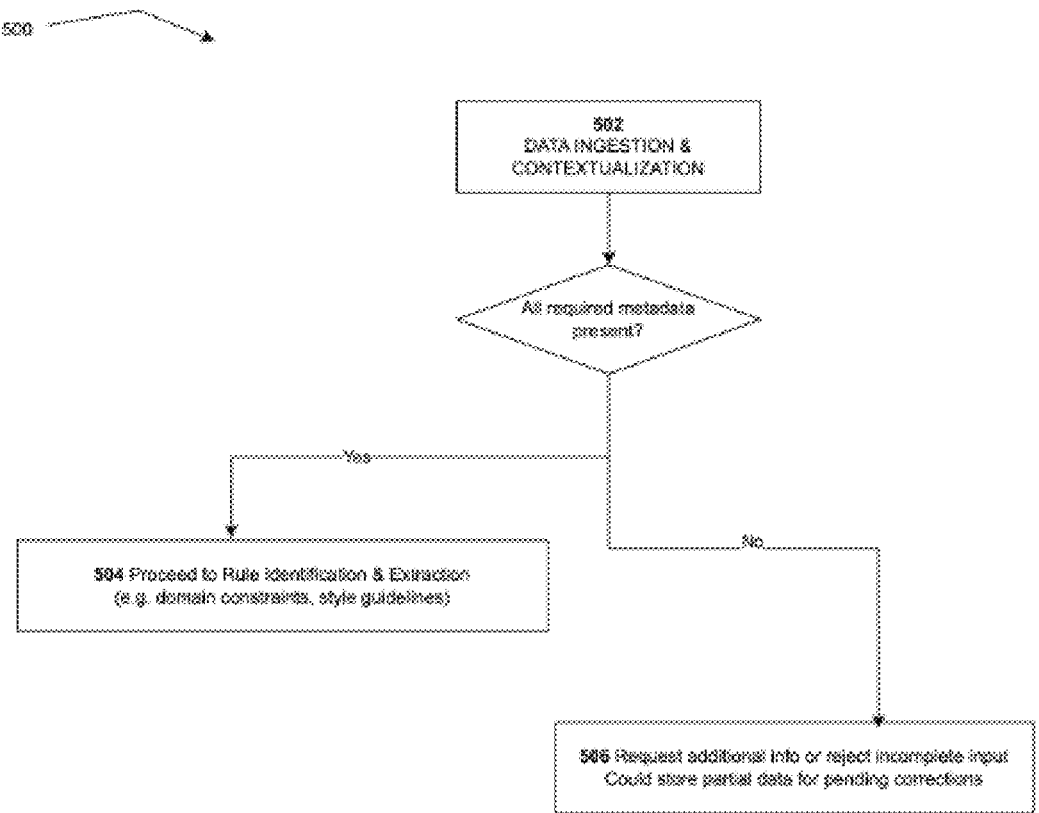
FIG. 5 is a flowchart of a data processing method.

FIG. 5 illustrates a flowchart of a data processing method 500. The method 500 may begin with a data ingestion and contextualization step 502, where data may be received and processed with contextual information. In some cases, the data ingestion and contextualization step 502 may utilize components of the evaluation system 300, such as the data ingestion module 302, which may include the text processor 304, image analyzer 306, audio processor 308, and video analyzer 310 to handle various input formats.

From the data ingestion and contextualization step 502, the method 500 may proceed to a decision point that checks whether all required metadata is present. This decision point may create two possible paths through the flowchart.

If all required metadata is present, the method 500 may proceed to a step 504, where rule identification and extraction may occur. In some implementations, the step 504 may involve processing domain constraints and style guidelines. The rule extraction engine 414 may be utilized during this step to interface with external sources 422 and obtain relevant evaluation rules and guidelines.

If all required metadata is not present, the method 500 may proceed to a step 606. In the step 306, the system may request additional information or reject incomplete input. In some cases, the step 306 may also indicate that partial data could be stored for pending corrections. This step may involve interaction with the user feedback interface 424 to obtain the necessary additional information.

The method 500 may incorporate data validation checks and provide alternative paths for handling both complete and incomplete data inputs. This approach may allow the evaluation process 400 to maintain data integrity and ensure that all necessary information is available for accurate evaluation.

In some implementations, the knowledge base 312 may be accessed throughout the method 300 to provide relevant information for data contextualization and rule extraction. The method 500 may also update the knowledge base 312 with new insights gained during the processing of inputs.

The chain-of-agents pipeline 514 may be involved in various stages of the method 500, with different agents potentially handling specific tasks. For example, the planning agent 316 may be involved in determining the evaluation strategy based on the available metadata, while the analysis agent 318 may assist in the data contextualization process.

By following this structured approach to data processing, the method 500 may ensure that inputs are properly contextualized and that appropriate rules are identified for subsequent evaluation steps. This may contribute to the overall effectiveness and accuracy of the evaluation process 400.

Figure 6:
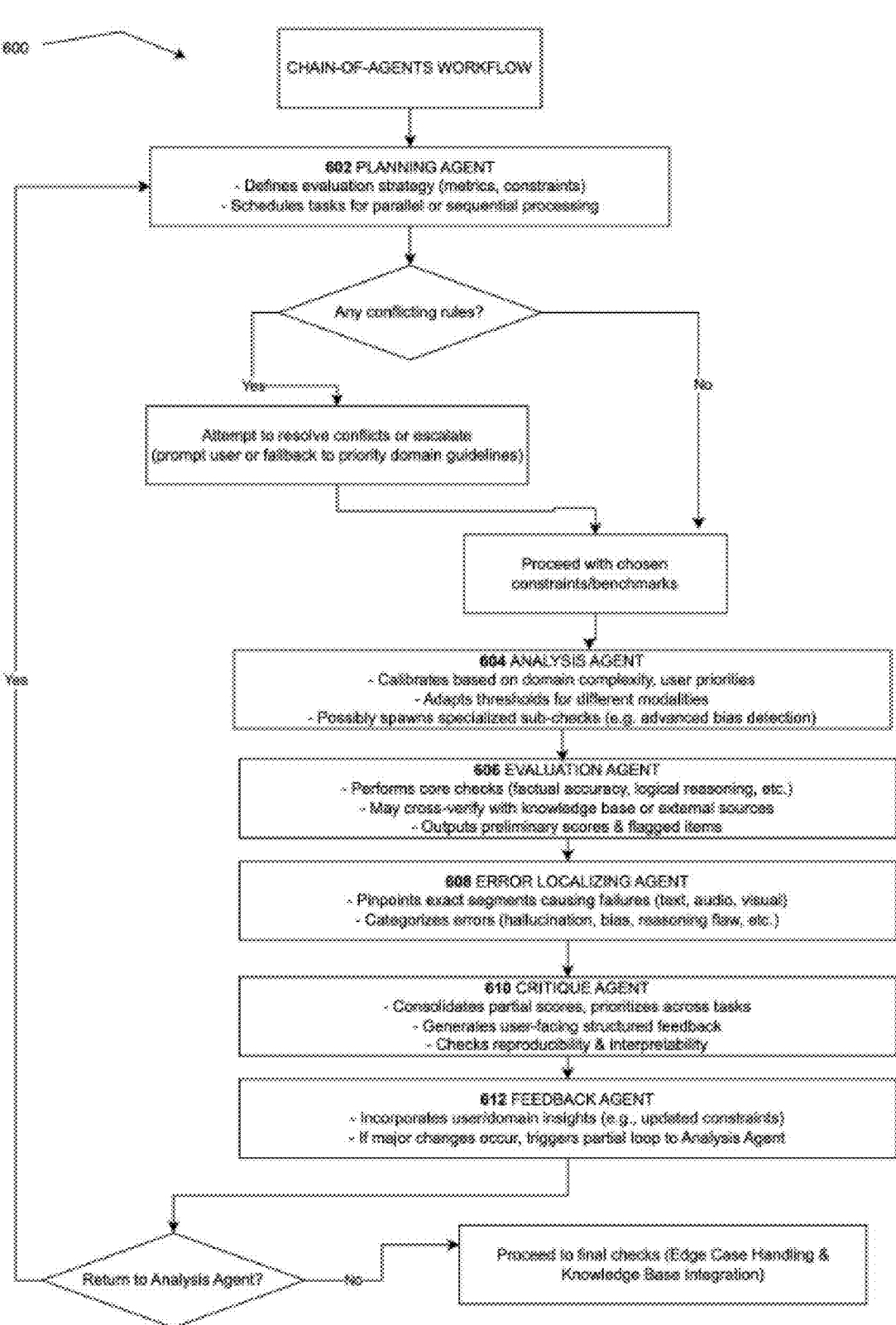
FIG. 6 illustrates a chain-of-steps workflow for evaluating generative AI outputs.

FIG. 6 illustrates a chain-of-steps workflow 600 for evaluating generative AI outputs. The workflow 600 may begin with a Planning Step 602 that may define evaluation strategy including metrics and constraints, and schedule tasks for parallel or sequential processing.

The workflow 600 may then proceed to a decision point that checks for conflicting rules. If conflicting rules are detected, the workflow 600 may move to attempt conflict resolution or escalation, which may prompt the user or fall back to priority domain guidelines. If no conflicts are detected, or after conflict resolution, the workflow 600 may proceed with chosen constraints and benchmarks.

The workflow 600 may continue to an Analysis Step 604, which may calibrate based on domain complexity and user priorities, adapt thresholds for different modalities, and spawn specialized sub-checks. In some cases, the Analysis Step 604 may utilize information from the knowledge base 312 to inform its calibration process.

The workflow 600 may then move to an Evaluation Step 606, which may perform core checks and cross-verify with the knowledge base 312 or external sources 322. The Evaluation Step 606 may provide reasoning and explanations for each assessment, ensuring transparency and interpretability in the evaluation process.

Following the Evaluation Step 606, the workflow 600 may proceed to an Error Localization Step 608. The Error Localization Step 608 may pinpoint exact segments causing failures and categorize errors. In some implementations, the Error Localization Step 608 may identify specific sections of text, images, or structured data that contribute to incorrect outputs, allowing for precise error identification and potential correction.

The workflow 600 may then move to a Critique Step 610, which may consolidate partial scores, prioritize across tasks, generate user-facing structured feedback, and check reproducibility and interpretability. The Critique Step 610 may ensure that the evaluation results are comprehensive and actionable.

The workflow 600 may continue to a Feedback Step 612, which may incorporate user or domain insights. In some cases, the Feedback Step 612 may enable evaluation tailored to specific use cases and adapt assessment criteria based on real-world constraints. This adaptability may allow the evaluation process to remain relevant and effective across various applications.

The Feedback Step 612 may trigger a partial loop back to the Analysis Step 604 if major changes occur. The workflow 600 may then reach a decision point to determine whether to return to the Analysis Step 604. If returning to the Analysis Step 604, the workflow 600 may loop back for further analysis. If not returning to the Analysis Step 604, the workflow 600 may proceed to final checks including edge case handling and knowledge base integration.

Throughout the workflow 600, the various steps may interact with the knowledge base 312, potentially updating it with new insights or accessing stored information to inform their processes. This interaction may contribute to the continuous improvement and adaptability of the evaluation system 300.

The chain-of-agents workflow 600 may provide a structured, comprehensive approach to evaluating generative AI outputs. By utilizing specialized steps for different aspects of the evaluation process, the workflow 600 may offer detailed, context-aware assessments that can be tailored to specific use cases and evolve based on user feedback and real-world constraints.

Figure 7:
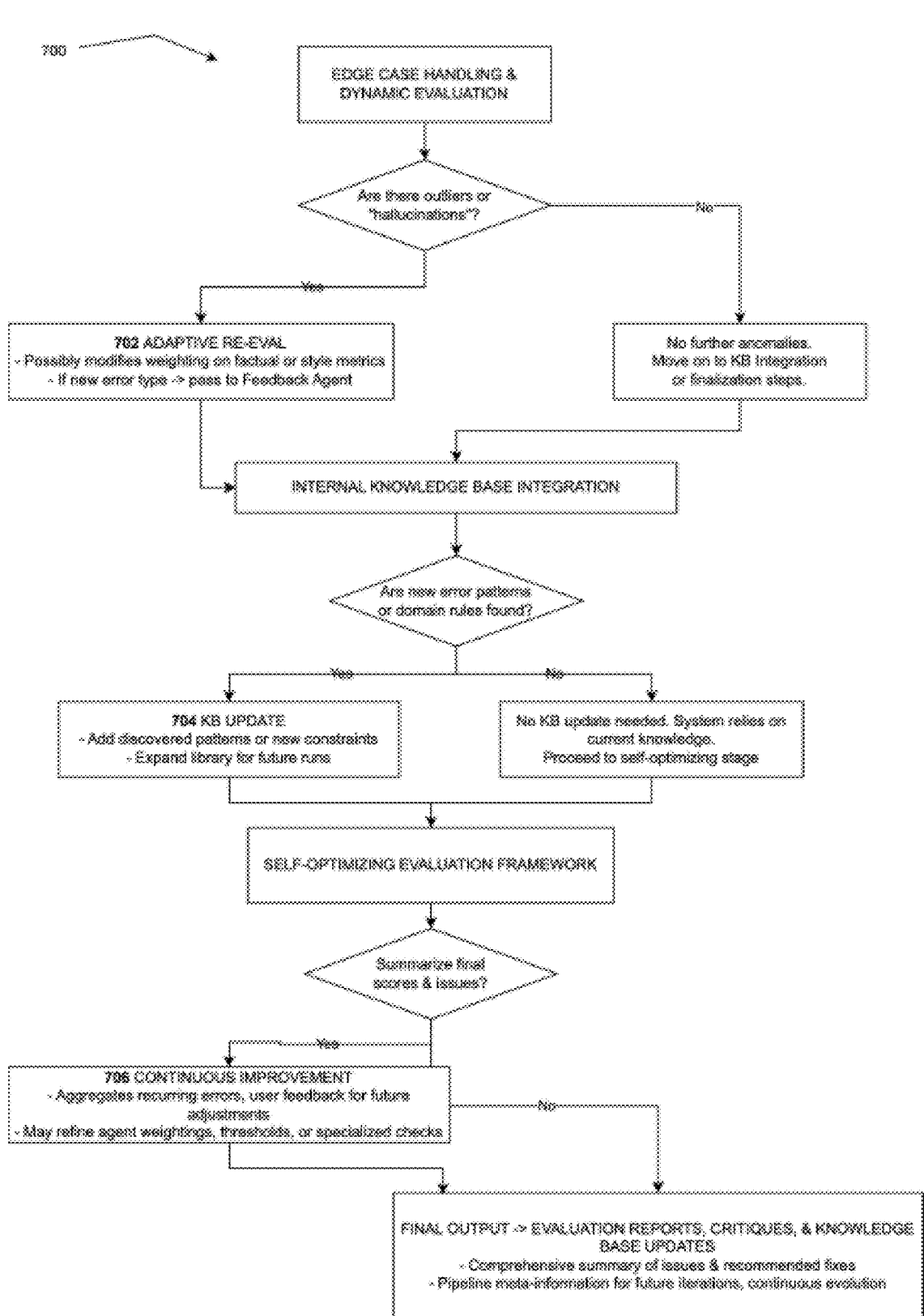
FIG. 7 is a flowchart of a method for edge case handling and dynamic evaluation.

FIG. 7 illustrates a flowchart of a method 700 for edge case handling and dynamic evaluation. The method 700 may begin with determining whether there are outliers or "hallucinations" in the output. From this decision point, the method 700 may follow one of two paths.

If outliers or hallucinations are detected, the method 700 may proceed to an adaptive re-evaluation 702. During the adaptive re-evaluation 702, the evaluation system 300 may modify weighting on factual or style metrics. In some cases, if a new error type is detected, the adaptive re-evaluation 702 may pass this information to the feedback step 612.

If no outliers or hallucinations are detected, the method 700 may indicate no further anomalies and move to knowledge base integration steps.

Following either path, the method 700 may proceed to internal knowledge base integration. At this stage, the method 700 may reach another decision point to determine whether new error patterns or domain rules are found.

If new patterns or rules are found, the method 700 may move to a KB update 704. During the KB update 704, the evaluation system 300 may add discovered patterns or new constraints and expand the library for future runs.

If no new patterns or rules are found, the method 700 may indicate no KB update is needed and proceed with current knowledge.

Both paths may then converge at a self-optimizing evaluation framework. The method 700 may then reach another decision point to determine whether to summarize final scores and issues.

If summarization is needed, the method 700 may proceed to a continuous improvement 706. During the continuous improvement 706, the evaluation system 300 may aggregate recurring errors and user feedback for future adjustments. In some cases, the continuous improvement 706 may refine step weightings, thresholds, or specialized checks.

The method 700 may conclude with final output, which may include evaluation reports, critiques, and knowledge base updates. This output may contain a comprehensive summary of issues and recommended fixes, along with pipeline meta-information for future iterations and continuous evolution.

The scoring framework of the evaluation system 300 may dynamically adjust weightings based on task complexity, domain specificity, and user-defined priorities. This dynamic adjustment may allow the method 700 to adapt its evaluation criteria to different types of inputs and specific use cases.

The evaluation system 300 may include a self-optimizing evaluation framework that may revise step strategies, rule thresholds, and scoring mechanisms. This self-optimization may occur throughout the method 700, particularly during the adaptive re-evaluation 702 and continuous improvement 706 stages. By continuously refining its evaluation processes, the method 700 may improve its accuracy and effectiveness over time.

In some cases, the method 700 may utilize various components of the evaluation system 300 throughout its execution. For example, the outlier detection module 328 may be involved in identifying outliers or hallucinations, while the knowledge base 312 may be updated during the KB update 704 stage. The step pipeline 314, including steps such as the evaluation step 320 and the error localization step 322, may be involved in various stages of the method 700 to perform specific evaluation tasks.

Consider an example of GenAI-Based Code Generation Platforms (CGP1-CGP5), the system evaluates five different Code Generation Platforms (CGP1-CGP5). Each platform is assessed based on multiple dimensions, including factual accuracy, coherence, bias detection, robustness, and ethical alignment. The evaluation process follows a systematic chain-of-agents pipeline, with each step performing a specific task in the assessment.

The system begins by receiving multi-modal outputs from the five code generation platforms, which provide code snippets based on user queries such as writing functions, solving algorithmic problems, or generating API calls. The data ingestion module contextualizes these outputs by associating them with metadata, such as the query type, platform-specific guidelines, and task complexity (e.g., simple function generation vs. complex algorithmic solutions). Once contextualized, the data is passed to the chain-of-agents evaluation pipeline for further analysis.

Next, the system extracts evaluation rules and expected behaviors from the knowledge base, which includes domain-specific coding rules, performance benchmarks, legal considerations, and ethical guidelines. These rules are used by the Planning Agent to define the evaluation strategy for each platform. For example, if CGP1 (based on GitHub Copilot) is known for high factual accuracy but struggles with narrative coherence, the system prioritizes fact-checking and logical consistency in the evaluation. Similarly, CGP2 (based on OpenAI Codex), which excels in writing complex algorithms, has an evaluation strategy that emphasizes robustness and edge case handling.

The Analysis Agent contextualizes the input data and calibrates the evaluation metrics based on the task complexity. If CGP3 generates a solution that is correct but violates best practices for readability, the Analysis Agent flags it for review. The Evaluation Agent applies several assessment methodologies, including heuristic scoring, machine learning-based evaluation, statistical anomaly detection, and logical reasoning assessments, to evaluate multiple dimensions of the code's performance. For instance, if CGP4 produces a function with logical errors (e.g., infinite loops), the system identifies this using logical reasoning and flags the output.

The Error Localizing Agent then identifies and classifies errors in the code. For example, if CGP5 generates a function with missing edge case handling, the agent highlights the specific lines where the issue occurs. The Critique Agent performs a final review, consolidating the results and ensuring consistency across the evaluations. This agent normalizes scores, ensuring that the evaluation of relevance, coherence, brevity, and coverage for each platform is aligned and appropriately weighted.

Finally, the Feedback Agent integrates user feedback into the evaluation process. If users report that CGP3 generated code that works but lacks commenting or documentation, the Feedback Agent adjusts the evaluation parameters to account for these aspects in future assessments.

When outliers or deviations are detected, such as hallucinated responses or unconventional solutions, the system adjusts evaluation parameters accordingly. For example, if CGP4 generates overly complex code, the system may reduce the weight placed on complexity and increase emphasis on clarity and efficiency. The system then proceeds to generate an evaluation summary for each platform, detailing their strengths, weaknesses, and suggested improvements.

| Plat-form | Factual Accuracy | Co-herence | Effi-ciency | Edge Cases | Final Verdict |
|---|---|---|---|---|---|
| | | Evaluation Summary Table: | | | |
| CGP1 | 9/10 | 6/10 | 8/10 | 7/10 | Reliable, but lacks narrative coherence. Needs improvement in structuring more coherent outputs. |
| CGP2 | 9/10 | 7/10 | 9/10 | 8/10 | Excellent for complex problems, but readability can be improved. |
| CGP3 | 5/10 | 9/10 | 6/10 | 5/10 | Strong relevance, but suffers from logical errors and efficiency issues. |
| CGP4 | 8/10 | 6/10 | 7/10 | 9/10 | Good at handling complex tasks but needs stylistic improvements. |
| CGP5 | 8/10 | 7/10 | 6/10 | 5/10 | Generally good, but requires more documentation and better handling of edge cases. |

The system generates a detailed report based on the evaluation summary, comparing the performance of each platform. For example, CGP1 shows strong factual accuracy but suffers from coherence issues, which need to be addressed. CGP2 excels in complex algorithm handling but could benefit from better code readability. CGP3 generates highly relevant code but suffers from logical inconsistencies and inefficiency, while CGP4 is proficient in complex tasks but needs improvements in stylistic aspects such as clarity. CGP5, though generally good, requires better documentation and edge case handling.

Recommendations for each platform are provided, such as enhancing coherence for CGP1, improving readability for CGP2, and adding better edge case handling and documentation for CGP5. User feedback is integrated into the Feedback Agent, allowing for continuous refinement of evaluation criteria, ensuring that the system evolves alongside the platforms it evaluates.

By following this detailed, structured evaluation process, the system provides a comprehensive, actionable insight into the strengths and weaknesses of each code generation platform, ensuring fairness, transparency, and continuous improvement.

Consider another example, When a GenAI system produces an incorrect text fragment-such as "The Eiffel Tower is located in Berlin"-our evaluation framework not only flags the factuality breach but also identifies exactly where the mistake occurs. Internally, the fine-tuned neural network's attention weights are projected back onto each input token, and the tokens most responsible for the low factuality score ("Berlin" in this case) are grouped into a contiguous span. The system then returns a structured error stub pointing to token positions six through six and the text "Berlin," so that developers know precisely which word to correct. Likewise, when evaluating a generated image whose caption reads "A motorcycle parked by a tree" but actually depicts a bicycle, the framework computes gradients of the visual-object accuracy loss with respect to intermediate feature maps. The region with the largest gradient magnitude—corresponding to the bicycle—is extracted as a bounding box (for example, x=80 px, y=120 px, width=200 px, height=150 px). By returning this box alongside the error stub, the system clearly indicates that the object inside those pixel coordinates is mislabeled. In both text and image cases, these localized pointers enable rapid correction, targeted retraining, and continuous improvement of the GenAI models.

Agent Training

The training process for each agent in the system is crucial for ensuring optimal performance in evaluating Generative AI (GenAI) outputs across various domains and tasks. Each agent must be trained to handle specific aspects of the evaluation process, from defining evaluation strategies to identifying errors and integrating user feedback.

The Planning Agent plays a key role in defining evaluation strategies. It must learn how to select the right benchmarks, metrics, and priorities for different tasks, whether the task is related to code generation, content creation, or another domain. The training data for this agent includes historical evaluation data, domain-specific rules, and user feedback on which evaluation criteria matter most. The training process for this agent involves supervised learning, where it is trained on labeled data that demonstrates the effectiveness of different evaluation strategies for various platforms and tasks. The agent may also undergo reinforcement learning to fine-tune its decision-making over time, learning to adjust its approach based on the success or failure of its evaluation strategy in real-world use cases.

The Analysis Agent is responsible for contextualizing input data and calibrating evaluation metrics based on task complexity. It requires training data that includes diverse input datasets from various domains, such as code snippets, images, and text, with annotations indicating the complexity of the task and its associated metrics. The training process involves supervised learning on labeled data to help the agent learn how to adjust its evaluation metrics based on task complexity. Transfer learning can also be used here, allowing the agent to apply knowledge learned from one domain to another, such as transferring insights from text generation to image captioning.

The Evaluation Agent applies different methodologies, including heuristic scoring, machine learning models, statistical anomaly detection, and logical reasoning. This agent requires labeled evaluation datasets that contain outputs from various models, along with ground truth labels indicating whether the output is correct or relevant. The training process involves supervised learning, where the agent learns to apply various evaluation methodologies to assess the quality of the output. It may also use unsupervised learning for anomaly detection, identifying deviations from expected patterns in the outputs, and reinforcement learning to adjust scoring criteria based on feedback and model performance.

The Error Localizing Agent identifies and classifies errors in the output, such as logical errors, syntax issues, or biases. The training data for this agent includes error-tagged datasets, where mistakes in the output are labeled and categorized. The training process involves supervised learning, where the agent learns to recognize and classify different error types. Clustering and classification techniques can also be employed to group similar errors and improve the agent's ability to pinpoint specific sections of the output that need correction. This agent may also use transfer learning to handle multimodal outputs, adapting error localization techniques for text, images, or code.

The Critique Agent ensures that the evaluation results are consistent and aligned with predefined standards. This agent consolidates the output from various agents and normalizes the evaluation scores. The training data for this agent includes multi-agent evaluation results, where outputs from other agents have been evaluated and annotated for consistency and reproducibility. The training process involves supervised learning to help the agent learn to reconcile differences in the results of the evaluation agents and ensure the final scores align with the pre-established norms. The agent may also use rule-based learning to ensure consistency in the application of evaluation standards across different tasks.

Finally, the Feedback Agent integrates user feedback to refine the evaluation process. It receives data from users about which evaluation criteria worked well or need improvement. The training data includes user feedback on GenAI outputs, along with historical corrections and behavioral data from users interacting with the platform. The training process for the Feedback Agent involves reinforcement learning, where it learns to integrate user feedback effectively into the evaluation loop. The agent may also use active learning to identify the most informative feedback that will lead to the most substantial improvements in future evaluations.

In conclusion, each agent in the system is trained using a combination of supervised learning, reinforcement learning, transfer learning, and active learning. The agents rely on diverse training data that includes labeled evaluation datasets, error-tagged content, user feedback, and domain-specific rules. Through this training, each agent becomes adept at handling specific aspects of the evaluation process, ensuring the system provides accurate, consistent, and context aware evaluations of GenAI outputs.

Figure 8:
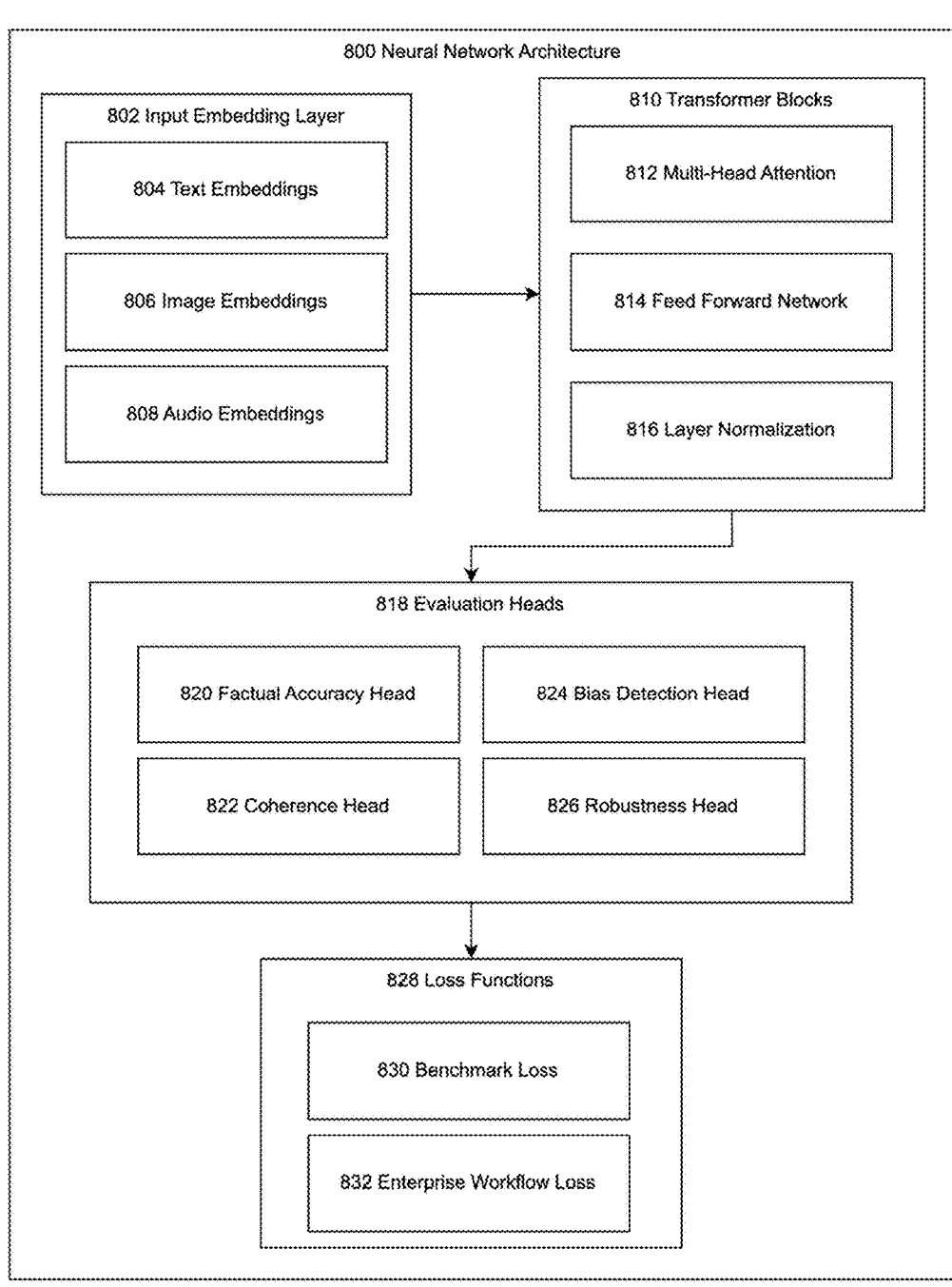
FIG. 8 illustrates a neural network architecture for multimodal content evaluation within a generative artificial intelligence evaluation system.

FIG. 8 illustrates a neural network architecture 800 for multimodal content evaluation within the generative artificial intelligence evaluation system. The neural network architecture 800 may comprise multiple specialized components that enable comprehensive assessment of diverse content types through a unified evaluation framework.

The architecture includes an input embedding layer 802 that processes different types of input data received from generative AI systems. The input embedding layer 802 may comprise text embeddings 804, image embeddings 806, and audio embeddings 808 for handling respective data modalities. In some cases, the text embeddings 804 may utilize byte-pair encoding techniques to convert textual content into dense vector representations, while the image embeddings 806 may apply vision-transformer processing to extract visual features from generated images. The audio embeddings 808 may employ pretrained audio models to capture acoustic characteristics and temporal patterns within synthesized audio content.

The neural network architecture 800 further includes transformer blocks 810 that process the embedded inputs through attention mechanisms and feed-forward processing. The transformer blocks 810 may comprise multi-head attention 812 components that enable the network to focus on relevant content features across different modalities simultaneously. Feed forward networks 814 within the transformer blocks 810 may apply non-linear transformations to the attention outputs, while layer normalization 816 components may stabilize the training process and improve convergence characteristics.

The architecture incorporates evaluation heads 818 that generate assessment outputs for different evaluation criteria based on the processed representations from the transformer blocks 810. The evaluation heads 818 may comprise specialized components including a factual accuracy head 820, a coherence head 822, a bias detection head 824, and a robustness head 826. In some cases, each evaluation head may be configured to assess specific quality dimensions of the input content, with the factual accuracy head 820 analyzing the correctness of factual claims, the coherence head 822 evaluating logical consistency and narrative flow, the bias detection head 824 identifying potential biases or unfair representations, and the robustness head 826 assessing content stability across different evaluation scenarios.

The neural network architecture 800 may also include loss functions 828 that guide the training optimization process for the thirty billion parameter network. The loss functions 828 may comprise benchmark loss 830 and enterprise workflow loss 832 components that correspond to the two-stage fine-tuning approach described in the evaluation methodology. In some cases, the benchmark loss 830 may optimize the network performance on publicly available evaluation suites to establish canonical scoring dimensions, while the enterprise workflow loss 832 may adapt the network to real-world business applications and domain-specific quality requirements.

The architecture may enable dynamic prompting capabilities where evaluation criteria weights determined through embedding similarity analysis may be incorporated into the network processing at runtime. In some cases, the transformer blocks 810 may receive contextual information about criterion importance, allowing the evaluation heads 818 to adjust their assessment emphasis according to domain-specific requirements and content characteristics. The multi-modal processing capability may enable the network to handle text, image, and audio inputs through unified evaluation workflows while maintaining modality-specific processing optimizations within the embedding layers and evaluation heads.

A number of implementations have been described. Nevertheless, it will be understood that various modifications may be made without departing from the spirit and scope of the disclosure. Accordingly, other implementations are within the scope of the following claims.

The invention claimed is:

1. A system for detecting errors, hallucinations, and biases in outputs generated by generative artificial intelligence models, the system comprising a memory storing a knowledge base containing domain-specific evaluation rules and historical error patterns; and a processor operatively coupled to the memory and configured for:

parsing a received Generative Artificial Intelligence (GenAI) output to generate a metadata string comprising one or more tags;

applying a recommendation algorithm to the metadata string to generate a weighted metric profile for evaluating the GenAI output, wherein the weighted metric profile comprises one or more criteria for evaluation and associated evaluation rules;

generating an embedding corresponding to the GenAI output;

determining weights of the one or more criteria based on similarity between the embedding and domain vectors stored in the knowledge base;

applying a neural network, trained on benchmark and enterprise-annotated data, to generate per-criterion scores and pass-fail rationales;

detecting a set of error stubs by comparing the per-criterion scores to corresponding thresholds to identify one or more criterion breaches, wherein each error stub being stored as a machine-readable structured record comprising at least an output identifier, a criterion identifier, an actual score, a threshold, a rationale pointer, and one of (i) token byte-offsets for text, (ii) mask coordinates for images, or (iii) time-window indices for audio or video;

localizing one or more error positions within the output based on the set of error stubs, wherein localizing comprises projecting attention maps onto tokens and grouping contiguous token spans for text, selecting image masks having maximum rule-violation gradients for images, or identifying time windows exceeding a violation-likelihood threshold for audio or video, and, responsive to the localization, (a) halting a generation process or automatically requesting regeneration upon a severe criterion breach, and (b) prompting an inference engine to perform targeted re-evaluation limited to the localized token spans, masks, or time windows while preserving non-localized portions of the output; and updating the knowledge base based on the detected error stubs to continuously improve GenAI output evaluation process, wherein the knowledge base is updated by one or more of adding newly detected error patterns, adjusting weights of domain-specific evaluation rules; and revising threshold for subsequent evaluations, the revised thresholds and weights being persisted in the knowledge base and, via an application interface or software development kit integrated with a deployed AI application, being automatically applied during subsequent inferences of the AI application.

2. The system of claim 1, wherein generating the embedding comprises applying a byte-pair encoding model to text outputs, applying a vision-transformer CLS head to image outputs, and applying a pretrained audio embedding model to audio outputs.

3. The system of claim 1, further comprising classifying the output as one of text, image, audio, or video, wherein classifying the output comprises applying a modality classifier to assign the output to the text, image, audio, or video category.

4. The system of claim 1, generating an evaluation report comprising the error stubs, localized error positions, and associated pass-fail rationales.

5. The system of claim 1, wherein generating the weighted metric profile comprises identifying a metric profile from a set of profiles based on prior evaluation selections, wherein the metric profile is identified by the recommendation algorithm.

6. The system of claim 1, wherein scoring the output comprises executing the neural network comprising thirty billion parameters, the neural network having been fine-tuned in two sequential passes, the two sequential passes comprising:

a first fine-tuning pass on item-rationale sets drawn from one or more publicly available evaluation suites to establish canonical scoring dimensions comprising one or more of factual accuracy, coherence, reasoning quality, harmfulness, bias, and robustness, wherein an evaluation suite comprising collections of benchmark tasks, example inputs, corresponding expected outputs or rationales, and scoring protocols for one or more quality dimensions.

7. The system of claim 1, wherein the neural network being dynamically prompted at runtime with determined weights of the one or more criteria for evaluating the GenAI output, for each criterion, a numeric score and a natural-language rationale.

8. The system of claim 3, wherein generating an embedding corresponding to the classified output comprises:

producing a fixed-length embedding vector that encodes semantic and structural features of the classified output;

normalizing the fixed-length embedding vector to unit length; and using the normalized embedding vector as a lookup key into the domain vectors stored in the knowledge base to retrieve the one or more criterion weights.

9. The system of claim 1, wherein determining weights comprising computing cosine similarity between the embedding and each domain vector and adjusting the one or more criterion weights according to the computed similarities.

10. The system of claim 1, wherein the per-criterion scores are generated for factual accuracy, coherence, bias, and robustness.

11. The system of claim 1, further comprising providing feedback through a software development kit integrated with an AI application to update model parameters based on the evaluation report.

12. The system of claim 1, further comprising monitoring generative artificial intelligence outputs in real time and adjusting evaluation thresholds based on model performance history.

13. The system of claim 1, further comprising integrating a user-provided knowledge base into the knowledge base to adapt evaluation rules to domain-specific terminology.

14. A computer-implemented method for detecting errors, hallucinations, and biases in outputs generated by generative artificial intelligence models, the method comprising:

parsing, by a processor, a received Generative Artificial Intelligence (GenAI) output to generate a metadata string comprising one or more tags;

applying, by the processor, a recommendation algorithm to the metadata string to generate a weighted metric profile for evaluating the GenAI output, wherein the weighted metric profile comprises one or more criteria for evaluation and associated evaluation rules;

generating, by the processor, an embedding corresponding to the GenAI output, wherein generating the embedding comprises applying a byte-pair encoding model to text outputs, applying a vision-transformer CLS head to image outputs, and applying a pretrained audio embedding model to audio outputs;

determining, by the processor, weights of the one or more criteria based on similarity between the embedding and domain vectors stored in the knowledge base;

applying, by the processor, a neural network, trained on benchmark and enterprise-annotated data, to generate per-criterion scores and pass-fail rationales;

detecting, by the processor, a set of error stubs by comparing the per-criterion scores to corresponding thresholds to identify one or more criterion breaches, wherein the set of error stubs comprising a criterion identifier, a breached threshold, an actual score, a rationale pointer, and one of (i) token byte-offsets for text, (ii) mask coordinates for images, or (iii) time-window indices for audio or video, and wherein the set of error stubs are stored in a structured record;

localizing, by the processor, one or more error positions within the output based on the set of error stubs, wherein localizing comprises projecting attention maps onto tokens and grouping contiguous token spans for text, selecting image masks having maximum rule-violation gradients for images, or identifying time windows exceeding a violation-likelihood threshold for audio or video, and, responsive to the localization, (a) halting a generation process or automatically requesting regeneration upon a severe criterion breach, and (b) prompting an inference engine to perform targeted re-evaluation limited to the localized token spans, masks, or time windows while preserving non-localized portions of the output; and updating, by the processor, the knowledge base based on the detected error stubs to continuously improve GenAI output evaluation process, wherein the knowledge base is updated by one or more of adding newly detected error patterns, adjusting weights of domain-specific evaluation rules; and revising threshold for subsequent evaluations, the revised thresholds and weights being persisted in the knowledge base and, via an application interface or software development kit integrated with a deployed AI application, being automatically applied during subsequent inferences of the AI application.

15. The method of claim 14, further comprising classifying the output as one of text, image, audio, or video, wherein classifying the output comprises applying a modality classifier to assign the output to the text, image, audio, or video category.

16. The method of claim 14, generating an evaluation report comprising the error stubs, localized error positions, and associated pass-fail rationales.

17. The method of claim 14, wherein generating the weighted metric profile comprises identifying a metric profile from a set of profiles based on prior evaluation selections, wherein the metric profile is identified by the recommendation algorithm.

18. The method of claim 14, wherein scoring the output comprises executing the neural network comprising thirty billion parameters, the neural network having been fine-tuned in two sequential passes, the two sequential passes comprising:

a first fine-tuning pass on item-rationale sets drawn from one or more publicly available evaluation suites to establish canonical scoring dimensions comprising one or more of factual accuracy, coherence, reasoning quality, harmfulness, bias, and robustness, wherein an evaluation suite comprising collections of benchmark tasks, example inputs, corresponding expected outputs or rationales, and scoring protocols for one or more quality dimensions.

19. The method of claim 14, wherein the neural network being dynamically prompted at runtime with determined weights of the one or more criteria for evaluating the GenAI output, for each criterion, a numeric score and a natural-language rationale.

20. The method of claim 14, wherein generating an embedding corresponding to the classified output comprises:

producing a fixed-length embedding vector that encodes semantic and structural features of the classified output;

normalizing the fixed-length embedding vector to unit length; and using the normalized embedding vector as a lookup key into the domain vectors stored in the knowledge base to retrieve the one or more criterion weights.

* * * * *